(12) United States Patent
Deokar et al.

(10) Patent No.: US 8,732,602 B2
(45) Date of Patent: May 20, 2014

(54) SYSTEM AND METHOD FOR ALTERING A USER INTERFACE OF A POWER DEVICE

(75) Inventors: Vishwas Mohaniraj Deokar, Acton, MA (US); James S. Spitaels, Shrewsbury, MA (US); Himanshu Trivedi, Rochester, NH (US); Fred W. Rodenhiser, Wilmington, MA (US); Kyle Brookshire, Belmont, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 489 days.

(21) Appl. No.: 12/412,582

(22) Filed: Mar. 27, 2009

(65) Prior Publication Data

US 2010/0246101 A1    Sep. 30, 2010

(51) Int. Cl.
*G06F 3/048* (2013.01)

(52) U.S. Cl.
USPC ........... 715/771; 715/703; 715/744; 715/772; 715/866

(58) Field of Classification Search
USPC .................... 715/866, 703, 744, 771, 772
See application file for complete search history.

(56) References Cited

U.S. PATENT DOCUMENTS

| | | |
|---|---|---|
| 4,217,645 A | 8/1980 | Barry et al. |
| 4,394,741 A | 7/1983 | Lowndes |
| 4,564,767 A | 1/1986 | Charych |
| 4,692,632 A | 9/1987 | Gaul et al. |
| 4,782,241 A | 11/1988 | Baker et al. |
| 5,019,717 A | 5/1991 | McCurry et al. |
| 5,126,585 A | 6/1992 | Boys |
| 5,170,124 A | 12/1992 | Blair et al. |
| 5,184,025 A | 2/1993 | McCurry et al. |
| 5,291,383 A | 3/1994 | Oughton |
| 5,315,533 A | 5/1994 | Stich et al. |
| 5,319,571 A | 6/1994 | Langer et al. |
| 5,321,626 A | 6/1994 | Palladino |
| 5,321,627 A | 6/1994 | Reher |
| 5,325,041 A | 6/1994 | Briggs |
| 5,381,554 A | 1/1995 | Langer et al. |
| 5,455,499 A | 10/1995 | Uskali et al. |
| 5,458,991 A | 10/1995 | Severinsky |

(Continued)

FOREIGN PATENT DOCUMENTS

| | | |
|---|---|---|
| EP | 0801342 A2 | 10/1997 |
| EP | 1522920 A2 | 4/2005 |

(Continued)

OTHER PUBLICATIONS

International Search Report and Written Opinion from corresponding International Application No. PCT/2010/028321, dated Jun. 30, 2010.

(Continued)

*Primary Examiner* — Amy Ng
*Assistant Examiner* — Claudia Dragoescu
(74) *Attorney, Agent, or Firm* — Lando & Anastasi, LLP

(57) ABSTRACT

A system and method for altering a user interface of a power device is provided. The user interface includes an interface structure. The method includes acts of receiving user preference information, determining additional configuration information of the power device, adapting the interface structure based at least in part on the user preference information and the additional configuration information and providing at least a portion of the adapted interface structure to a user via the user interface.

21 Claims, 21 Drawing Sheets

(56) References Cited

U.S. PATENT DOCUMENTS

| | | | |
|---|---|---|---|
| 5,579,197 A | 11/1996 | Mengelt et al. |
| 5,602,462 A | 2/1997 | Stich et al. |
| 5,664,202 A | 9/1997 | Chen et al. |
| 5,666,040 A | 9/1997 | Bourbeau |
| 5,793,627 A | 8/1998 | Caldes et al. |
| 5,886,890 A | 3/1999 | Ishida et al. |
| 5,917,719 A | 6/1999 | Hoffman et al. |
| 5,923,099 A | 7/1999 | Bilir |
| 6,031,354 A | 2/2000 | Wiley et al. |
| 6,170,007 B1 | 1/2001 | Venkatraman et al. |
| 6,175,511 B1 | 1/2001 | Ooba |
| 6,184,593 B1 | 2/2001 | Jungreis |
| 6,201,319 B1 | 3/2001 | Simonelli et al. |
| 6,201,371 B1 | 3/2001 | Kawabe et al. |
| 6,204,574 B1 | 3/2001 | Chi |
| 6,268,711 B1 | 7/2001 | Bearfield |
| 6,274,950 B1 | 8/2001 | Gottlieb et al. |
| 6,285,178 B1 | 9/2001 | Ball et al. |
| 6,301,674 B1 | 10/2001 | Saito et al. |
| 6,329,792 B1 | 12/2001 | Dunn et al. |
| 6,433,444 B1 | 8/2002 | de Vries |
| 6,465,910 B2 | 10/2002 | Young et al. |
| 6,469,471 B1 | 10/2002 | Anbuky et al. |
| 6,493,243 B1 | 12/2002 | Real |
| 6,549,014 B1 | 4/2003 | Kutkut et al. |
| 6,584,329 B1 | 6/2003 | Wendelrup et al. |
| 6,700,351 B2 | 3/2004 | Blair et al. |
| 6,784,641 B2 | 8/2004 | Sakai et al. |
| 6,795,322 B2 | 9/2004 | Aihara et al. |
| 6,854,065 B2 | 2/2005 | Smith et al. |
| 6,894,622 B2 | 5/2005 | Germagian et al. |
| 6,922,347 B2 | 7/2005 | Lanni |
| 6,923,676 B2 | 8/2005 | Perry |
| 6,983,212 B2 | 1/2006 | Burns |
| 7,015,599 B2 | 3/2006 | Gull et al. |
| 7,050,312 B2 | 5/2006 | Tracy et al. |
| 7,057,308 B2 | 6/2006 | Stranberg et al. |
| 7,082,541 B2 | 7/2006 | Hammond et al. |
| 7,132,833 B2 | 11/2006 | Layden et al. |
| 7,141,891 B2 | 11/2006 | McNally et al. |
| 7,142,950 B2 | 11/2006 | Rasmussen et al. |
| 7,202,576 B1* | 4/2007 | Dechene et al. ................ 307/66 |
| 7,242,111 B2 | 7/2007 | Menas et al. |
| 7,259,477 B2 | 8/2007 | Klikic et al. |
| 7,274,112 B2 | 9/2007 | Hjort et al. |
| 7,301,249 B2 | 11/2007 | Stranberg et al. |
| 7,352,083 B2 | 4/2008 | Nielsen et al. |
| 7,402,921 B2 | 7/2008 | Ingemi et al. |
| 7,432,615 B2 | 10/2008 | Hjort |
| 7,446,433 B2 | 11/2008 | Masciarelli et al. |
| 7,456,518 B2 | 11/2008 | Hjort et al. |
| 7,512,906 B1* | 3/2009 | Baier et al. ................... 715/866 |
| 7,521,823 B2 | 4/2009 | Klikic et al. |
| 7,608,944 B2 | 10/2009 | Stranberg et al. |
| 7,615,890 B2 | 11/2009 | Masciarelli et al. |
| 7,615,891 B2 | 11/2009 | Wu et al. |
| 2001/0005894 A1 | 6/2001 | Fukui |
| 2001/0033502 A1 | 10/2001 | Blair et al. |
| 2001/0034735 A1 | 10/2001 | Sugiyama |
| 2002/0130556 A1 | 9/2002 | Hohri |
| 2002/0136042 A1 | 9/2002 | Layden et al. |
| 2002/0136939 A1 | 9/2002 | Grieve et al. |
| 2002/0138785 A1 | 9/2002 | Hammond et al. |
| 2003/0033550 A1 | 2/2003 | Kuiawa |
| 2003/0048006 A1 | 3/2003 | Shelter, Jr. et al. |
| 2003/0062775 A1 | 4/2003 | Sinha |
| 2003/0076696 A1 | 4/2003 | Tsai |
| 2003/0114963 A1 | 6/2003 | Walker |
| 2004/0036361 A1 | 2/2004 | Dai et al. |
| 2004/0104706 A1 | 6/2004 | Ooi et al. |
| 2005/0029984 A1 | 2/2005 | Cheng et al. |
| 2005/0071093 A1 | 3/2005 | Stefan |
| 2005/0071699 A1 | 3/2005 | Hammond et al. |
| 2005/0162129 A1 | 7/2005 | Mutabdzija et al. |
| 2005/0201127 A1 | 9/2005 | Tracy et al. |
| 2005/0227519 A1 | 10/2005 | Perry |
| 2006/0192436 A1 | 8/2006 | Stranberg et al. |
| 2006/0238941 A1 | 10/2006 | Ingemi et al. |
| 2007/0055409 A1 | 3/2007 | Rasmussen et al. |
| 2007/0064363 A1 | 3/2007 | Nielsen et al. |
| 2007/0067062 A1* | 3/2007 | Mairs et al. ................... 700/275 |
| 2007/0216229 A1 | 9/2007 | Johnson, Jr. et al. |
| 2008/0042491 A1 | 2/2008 | Klikic et al. |
| 2008/0157602 A1 | 7/2008 | Stranberg et al. |
| 2008/0301326 A1* | 12/2008 | Han et al. ......................... 710/19 |
| 2009/0150818 A1* | 6/2009 | Bakhreiba et al. ............. 715/771 |
| 2009/0160254 A1 | 6/2009 | Wu et al. |
| 2009/0201703 A1 | 8/2009 | Klikic et al. |
| 2009/0231892 A1 | 9/2009 | Klikic et al. |
| 2009/0237244 A1* | 9/2009 | Fujimaki ....................... 340/540 |
| 2009/0251002 A1 | 10/2009 | Cohen et al. |
| 2010/0049457 A1 | 2/2010 | Mutabdzija et al. |
| 2010/0201194 A1 | 8/2010 | Masciarelli et al. |
| 2010/0244566 A1 | 9/2010 | Spitaels et al. |

FOREIGN PATENT DOCUMENTS

| | | |
|---|---|---|
| WO | 9966394 A1 | 12/1999 |
| WO | 0233541 A2 | 4/2002 |
| WO | 2007029975 A1 | 3/2007 |

OTHER PUBLICATIONS

The First Office Action for the National Phase of the PCT Application for Chinese Application No. 201080012976.0, mailed Jun. 28, 2013, 10 pages.

* cited by examiner

SYSTEM AND METHOD FOR ALTERING A USER INTERFACE OF A POWER DEVICE

RELATED APPLICATIONS

This application incorporates herein by reference, in its entirety, U.S. patent application Ser. No. entitled "SYSTEM AND METHOD FOR CONFIGURING A POWER DEVICE," 12/412,567, filed on even date herewith, and assigned to the assignee of the present application.

BACKGROUND

1. Field of the Invention

At least one example in accordance with the present invention relates generally to systems and methods for providing power and more specifically to control systems and methods used to configure a power device such as an uninterruptible power supply (UPS).

2. Discussion of Related Art

The use of power devices, such as uninterruptible power supplies, to provide regulated, uninterrupted power for sensitive and/or critical loads, such as computer systems and other data processing systems, is known. A number of different UPS products are available including those identified under the trade name SMART-UPS from American Power Conversion Corporation of West Kingston R.I. In a typical UPS, a battery is used to provide backup power for a critical load during blackout or brownout conditions. A user of a typical UPS is able to configure and control the UPS either through a computer coupled to the UPS or through a user interface of the UPS itself.

SUMMARY OF THE INVENTION

Aspects in accord with the present invention are directed toward systems and methods for configuring a power device. According to one example, a method for directing a user to configure a power device via an alphanumeric user interface is provided. The power device may include data storage storing a plurality of operational parameters. The method includes acts of prompting, during an initial power-up of the power device, a user to enter an indication of quality of power supplied to the power device, receiving the indication via the user interface, determining a first value for each of the plurality of operational parameters of the power device based at least in part on the indication and applying each first value of the plurality of operational parameters to the power device.

In the method, the act of receiving the indication may include an act of requiring receipt of the indication. In addition, the act of receiving the indication via the user interface may include an act of receiving the indication via a user interface exposed by an external system and the method may further include an act of receiving, by the power device, the indication from the external system via an external system interface. Further, the act of receiving the indication via the user interface may include an act of receiving the indication via a user interface housed in the power device. Moreover, the act of receiving the indication via the user interface housed in the power device may include receiving the indication via a display housed in the user interface. Additionally, the act of determining the first value for each of the plurality of operational parameters may include an act of determining a value for at least one of an upper transfer point, a lower transfer point, a sensitivity of the power device to power changes, a frequency tolerance and an AVR operating mode. Furthermore, the act of applying each first value may include an act of storing each first value in the data storage.

The method may further include an act of reinitializing the power device, whereby the next power-up of the power device will be an initial power-up. Additionally, the method may further include acts of receiving, via the user interface, an indication to prolong battery runtime and adjusting, in response to the indication to prolong the battery runtime, the first value of at least one of the plurality of operational parameters of the power device. Moreover, the method may further include acts of receiving, via the user interface, an indication to prolong battery lifespan and adjusting, in response to the indication to prolong the battery lifespan, the first value of at least one of the plurality of operational parameters of the power device. Additionally, in the method, the act of determining the first value for each of the plurality of operational parameters may include an act of determining a value for at least one of an upper transfer point, a lower transfer point, a sensitivity of the power device to power changes, a frequency tolerance, an AVR operating mode and a self test frequency.

The method may further include acts of prompting the user to enter at least one indication of at least one user preference, receiving the at least one indication via the user interface and applying, to the power device, at least one second value of at least one of the plurality of operational parameters, the at least one second value being based at least in part on the at least one indication. In the method, the act of prompting the user to enter the at least one indication of the at least one user preference may include an act of prompting the user to enter at least one indication of at least one of a display mode value and a language value. Additionally, the act of prompting the user to enter the at least one indication of the at least one user preference may include an act of prompting the user to enter an indication of a menu type value and the act of applying, to the power device, at least one second value may include an act of adapting an interface structure based at least in part on the menu type value. Further, the act of adapting the interface structure may include act of activating elements within the interface structure and deactivating elements within the interface structure.

According to another example, a power device is provided. The power device includes a housing, an input to receive power from a power source, an output operatively coupled to the input and configured to provide power, a data storage disposed within the housing and a controller coupled the data storage. In the power device, the controller is configured to prompt, during an initial power-up of the power device, a user to enter an indication of quality of power supplied to the power device, receive the indication, determine a first value for each of the plurality of operational parameters of the power device based at least in part on the indication and apply each first value to the plurality of operational parameters.

In the power device, the controller may be configured to require receipt of the indication. The power device may further include an external system interface disposed within the housing and the controller may be coupled to the external system interface and may be configured to receive the indication via the external system interface. In addition, the power device may further include an alphanumeric user interface disposed within the housing and the controller may be coupled to the alphanumeric user interface and may be configured to receive the indication via the alphanumeric user interface. Moreover, the alphanumeric user interface may include a display.

In the power device, the controller may be configured to determine the first value for at least one of an upper transfer point, a lower transfer point, a sensitivity of the power device to power changes, a frequency tolerance and an AVR operating mode. In addition, the controller may be configured to store each first value in the data storage. Further, the controller may be configured to reinitialize the power device, whereby the next power-up of the power device will be an initial power-up. Moreover, the controller may be configured to receive an indication to prolong battery runtime and adjust, in response to the indication to prolong the battery runtime, the first value of at least one of the plurality of operational parameters of the power device. In addition, the controller may be configured to receive an indication to prolong battery lifespan and adjust, in response to the indication to prolong the battery lifespan, the first value of at least one of the plurality of operational parameters of the power device. Furthermore, the controller may be configured to determine the first value for at least one of an upper transfer point, a lower transfer point, a sensitivity of the power device to power changes, a frequency tolerance, an AVR operating mode and a self test frequency.

In the power device, the controller may be further configured to prompt the user to enter at least one indication of at least one user preference, receive the at least one indication and apply, to the power device, at least one second value of at least one of the plurality of operational parameters, the at least one second value being based at least in part on the at least one indication. Additionally, the controller may be configured to prompt the user to enter at least one indication of at least one of a display mode value and a language value. Further, the controller may be configured to prompt the user to enter an indication of a menu type value and to adapt an interface structure based at least in part on the menu type value. Moreover, the controller configured to adapt an interface structure may be further configured to activate elements within the interface structure and deactivate elements within the interface structure.

According to another example, another power device is provided. The power device includes a housing, an input to receive power from a power source, an output operatively coupled to the input and configured to provide power and a mechanism for directing, during an initial power-up of the power device, a user to configure the power device via an alphanumeric user interface.

According to another example, method for altering a user interface of a power device is provided. The user interface includes an interface structure. The method includes acts of receiving user preference information, determining additional configuration information of the power device, adapting the interface structure based at least in part on the user preference information and the additional configuration information and providing at least a portion of the adapted interface structure to a user via the user interface.

In the method, the act of receiving the user preference information may include an act of receiving at least one of a display mode preference, a language preference and a menu type preference. In addition, the act of determining additional configuration information may include an act of detecting at least one peripheral that is coupled to the power device. Furthermore, the act of detecting at least on peripheral may include an act of detecting at least one of a network management card and an external battery. Moreover, the act of determining additional configuration information may include an act of detecting that the power device is coupled to a remote computer system. Additionally, the act of detecting that the power device is coupled to the remote computer system may include an act of detecting software that is installed on the remote computer system. Furthermore, the act of adapting the interface structure may includes acts of activating elements within the interface structure and deactivating elements within the interface structure. Further still, the act of providing a portion of the adapted interface structure may include an act of displaying the portion in a display housed in the power device.

The method may further include an act of prompting the user to enter at least a portion of the user preference information during the initial configuration of the power device. In addition, the method may further include acts of identifying changes to at least one of the user preference information and the additional configuration information and adapting the interface structure based at least in part on the changes.

According to another example, another power device is provided. The power device includes a housing, an input to receive power from a power source, an output operatively coupled to the input and configured to provide power, a user interface disposed within the housing, a data storage disposed within the housing and a controller coupled to the user interface and the data storage. The controller is configured to receive user preference information, determine additional configuration information of the power device, adapt the interface structure based at least in part on the user preference information and the additional configuration information and provide at least a portion of the adapted interface structure to a user via the user interface.

In the power device, the controller configured to receive user preference information may be further configured to receive at least one of a display mode preference, a language preference and a menu type preference. Additionally, the controller may be configured to detect at least one peripheral that is coupled to the power device. Moreover, the controller may be configured to detect at least one of a network management card and an external battery. Further, the controller may be configured to detect that the power device is coupled to a remote computer system. In addition, the controller may be configured to detect software that is installed on the remote computer system. Furthermore, the controller may be configured to activate elements within the interface structure and deactivate elements within the interface structure.

In the power device, the controller may be configured to display the portion in a display housed in the power device. In addition, the controller may be further configured to prompt the user to enter at least a portion of the user preference information during an initial power-up of the power device. Furthermore, the controller may be further configured to identify changes to at least one of the user preference information and the additional configuration information and adapt the interface structure based at least in part on the changes.

According to another example, another power device is provided. The power device includes a housing, an input to receive power from a power source, an output operatively coupled to the input and configured to provide power and a mechanism for adapting an interface structure of the power device based at least in part on user preference information and additional configuration information.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Figure 1:
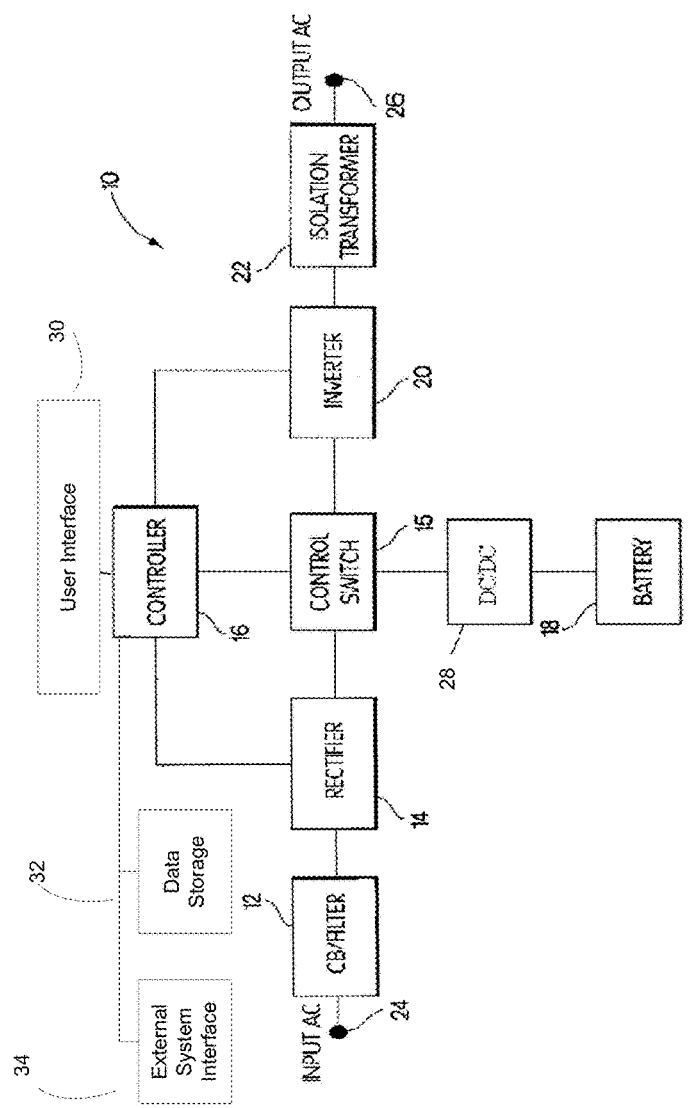
FIG. 1 is an example block diagram of a UPS in accordance with the present invention.

At least some examples in accordance with the present invention relate to systems and processes for providing improved control, monitoring and/or configuration of uninterruptible power supplies.

The aspects disclosed herein in accordance with the present invention, are not limited in their application to the details of construction and the arrangement of components set forth in the following description or illustrated in the drawings. These aspects are capable of assuming other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other examples.

FIG. 1 shows an on-line UPS 10 used to provide regulated, uninterrupted power in accordance with one example in accordance with the present invention. The UPS 10 includes an input circuit breaker/filter 12, a rectifier 14, a control switch 15, a controller 16, a battery 18, an inverter 20, an isolation transformer 22, a DC/DC converter 28, a user interface (UI) 30, data storage 32 and external system interface 34. The UPS also includes an input 24 for coupling to an AC power source, and an outlet 26 for coupling to a load.

The UPS 10 operates as follows. The circuit breaker/filter 12 receives input AC power from the AC power source through the input 24, filters the input AC power and provides filtered AC power to the rectifier 14. The rectifier 14 rectifies the input voltage. The DC/DC converter 28 regulates DC power from the battery 18. The control switch 15 receives the rectified power and also receives the DC power from the DC/DC converter 28. The controller 16 determines whether the power available from the rectifier 14 is within predetermined tolerances, and if so, controls the control switch 15 to provide the power from the rectifier 14 to the inverter 20. If the power from the rectifier 14 is not within the predetermined tolerances, which may occur because of "brown out" or "black out" conditions, or due to power surges, then the controller 16 controls the control switch 15 to provide the DC power from the DC/DC Converter 28 to the inverter 20.

In an alternative example, the battery is coupled to the rectifier circuit and the rectifier functions as a boost converter on-line mode of operation and on-battery mode of operation as described in U.S. Pat. No. 7,402,921, entitled "Method and Apparatus For Providing Uninterruptible Power," issued Jul. 22, 2008, which is hereby incorporated herein by reference in its entirety.

The inverter 20 of the UPS 10 receives DC power and converts the DC power to AC power and regulates the AC power to predetermined specifications. The inverter 20 provides the regulated AC power to the isolation transformer 22. The isolation transformer 22 is used to increase or decrease the voltage of the AC power from the inverter 20 and to provide isolation between a load and the UPS 10. The isolation transformer 22 is an optional device, the use of which is dependent on UPS output power specifications. Depending on the capacity of the battery 18 and the power requirements of the load, the UPS 10 can provide power to the load during brief power source dropouts or for extended power outages.

Using data stored in associated memory, the controller 16 performs one or more instructions that may result in manipulated data, and the controller 16 monitors and controls operation of the UPS 10. In some examples, the controller 16 may include one or more processors or other types of controllers. In one example, the controller 16 is a commercially available, general purpose processor. In another example, the controller 16 performs a portion of the functions disclosed herein on a general purpose processor and performs another portion using an application-specific integrated circuit (ASIC) tailored to perform particular operations. As illustrated by these examples, examples in accordance with the present invention may perform the operations described herein using many specific combinations of hardware and software and the invention is not limited to any particular combination of hardware and software components.

The data storage 32 stores computer readable and writable information required for the operation of the UPS 10. This information may include, among other data, data subject to manipulation by the controller 16 and instructions that are executable by the controller 16 to manipulate data. The data storage 32 may be a relatively high performance, volatile, random access memory such as a dynamic random access memory (DRAM) or static memory (SRAM) or may be a nonvolatile storage medium such as magnetic disk or flash memory. In one example, the data storage 32 includes both volatile and non-volatile storage. Various examples in accordance with the present invention can organize the data storage 32 into particularized and, in some cases, unique structures to perform the aspects and functions disclosed herein. In addition, these data structures may be specifically configured to conserve storage space or increase data exchange performance.

In one example, the data storage 32 includes data structures that house one or more operational parameters. As discussed further below, these operational parameters affect the operation of the UPS 10. Some example operational parameters include, among other operational parameters, a language parameter, a display mode parameter and a menu type parameter.

In some examples, the data storage 32 holds a configuration request. In these examples, a configuration request is an indication that the UPS 10 should direct the user to configure the UPS 10 at some future time. In one example, the UPS 10 is configured to respond to pending configuration requests immediately. In another example, the UPS 10 is configured to respond to pending configuration requests during its next power-up.

Configuration requests may be generated at various times, by various events. For example, a configuration request may be generated during the manufacturing process of the UPS 10, so that the user of the UPS 10 will be directed to configure the UPS 10 as part of its initial installation. In another example, the user may use the factory defaults screen 354 which, as discussed below, allows the user to revert the configuration of the UPS 10 to a default configuration established by the manufacturer. Such a re-initialization may generate a configuration request. In another example, the user may expressly create a configuration request via a user interface. While in some examples, the configuration request is initiated by storing the configuration request in data storage 32, examples of the present invention are not limited thereto. In other examples, the configuration request is created by other actions, such as actuation of a reset button, toggling of a dip switch or reception of the configuration request via the external system interface 34.

The external system interface 34 exchanges data with one or more external devices. These external devices may include any device configured to communicate using standards and protocols supported by the UPS 10. Examples of specific standards and protocols that the external system interface 34 may support include parallel, serial, and USB interfaces. Other examples of these supported protocols and standards include networking technologies such as UDP, TCP/IP and Ethernet technologies. In at least some examples, the external system interface includes a network management card (NMC) and a USB interface.

Figure 2:
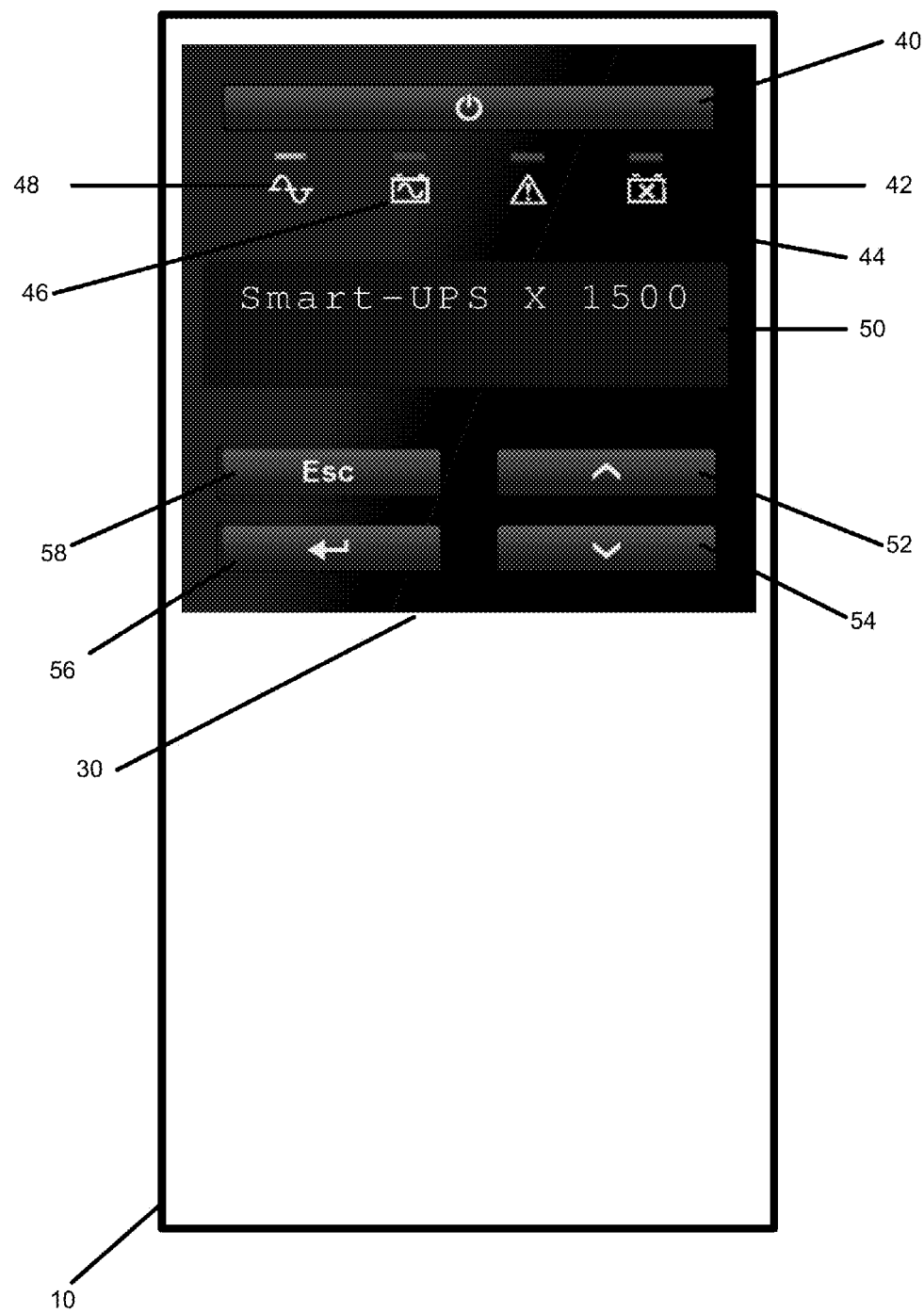
FIG. 2 illustrates an example of a user interface including a display that is housed in a UPS in accordance with the present invention.

The user interface 30 includes a display screen and a set of keys through which a user of the UPS 10 can monitor, control and configure operation of the UPS 10. FIG. 2 depicts an external view of the UPS 10 including the user interface 30.

As shown, the user interface 30 includes a power button 40, a replace battery indicator 42, a warning indicator 44, an on-battery power indicator 46, an on-line power indicator 48, an interface display 50, a scroll up button 52, a scroll down button 54, an enter button 56 and an escape button 58.

The user interface 30 functions as follows. The power button 40, when actuated, will cause the UPS 10 to toggle between power-on and power-off states. According to some examples, the UPS 10 performs a series of accompanying actions to better manage these power state transitions.

The set of indicators 42, 44, 46 and 48 provide various information regarding current and prior states of the UPS 10. For example, the UPS 10 may determine by running a self-test, that the battery 18 needs to be replaced. In this instance, the UPS 10 illuminates the replace battery indicator 42 to communicate this need.

The on-line power indicator 48 and the on-battery power indicator 46 signal the current source of power to the load. An active on-line power indicator 48 signals that the UPS 10 is providing power to the load in a normal operating fashion, i.e. the source of the power is the AC received through the input 24. Conversely, an active on-battery power indicator 46 signals that the source of the power to the load is the battery 18.

In another example, the UPS 10 may determine, for a variety of reasons, that the attention of the user is needed. The reasons may include, among others, detection that the battery 18 is disconnected or that the battery 18 has been depleted by the load. In this case, the UPS 10 signals the need for user attention by activating the warning indicator 44. In addition, the UPS 10 may provide a description of the reason for the warning in the interface display 50.

The interface display 50, which can be fashioned by a variety of hardware components including Liquid Crystal Displays and Light Emitting Diodes, presents a wide variety of information to a user. This information may include monitoring information, such as the status warnings discussed above. In addition, this information may include configuration information and prompts through which the UPS 10 collects information from the user. Together, the interface display 50 and buttons 52, 54, 56 and 58 provide the UPS 10 with more flexibility in exchanging information with the user than is available using conventional UPS technology.

In one example, UPS 10 includes an interface structure that can be navigated by the user using the interface display 50 and buttons 52, 54, 56 and 58. This interface structure may include a variety of elements related to one another in various ways. For example, the interface structure may be a hierarchical menu structure. The behavior initiated by actuation of the buttons 52, 54, 56 and 58 is dependent upon the current location of the user in the interface structure, as is the information displayed in the interface display 50.

For example, the current location of the user may be an intermediate location within the interface structure, i.e. the current location connects to other elements of the interface structure. In this situation, the interface display 50 displays one of a list of the other elements of the interface structure connected to the user's current location and the buttons 52, 54, 56 and 58 are configured to provide navigational functions. In this mode, the user can move through, and cause the interface display 50 to display each element of, the list of the elements of the interface structure that are connected to the current location. More precisely, the user can move up the list by actuating the scroll up button 52 and down the list by actuating the scroll down button 54. Furthermore, the user can navigate to the element of the interface structure currently displayed in interface display 50 by actuating the enter button 56. Conversely, the user can navigate to the user's previous location in the interface structure by actuating the escape button 58.

In another example, the current location of the user in the interface structure may cause the UPS 10 to display review information to the user via the interface display 50. This review information may be any information stored within the UPS 10 and may include, among other information, configuration information, operational information and information regarding other devices in communication with the UPS 10, such as devices to which the UPS 10 supplies power. In one example, the interface display 50 displays an element belonging to a list of review information and the buttons 52, 54, 56 and 58 are configured to provide review functions. Under this configuration, the user can move through, and cause the interface display 50 to display each element of the list of review information. More specifically, and much like the navigational mode discussed above, the user can navigate up or down the list of review information by actuating the scroll up button 52 or the scroll down button 54. Furthermore, the user can navigate to the user's previous location in the interface structure by actuating the escape button 58. In at least some examples, actuation of the enter button 56, while in this mode, results in an error message explaining that the other keys are the valid keys at the user's current location within the interface structure.

According to another example, the current location of the user in the interface structure may cause the UPS 10 to prompt the user for information through the interface display 50. The information prompted for may be any information stored within the UPS 10 and may include, among other information, configuration information, information regarding the source of power into the UPS 10 and information regarding other devices in communication with the UPS 10, such as devices to which the UPS 10 supplies power, i.e. elements of the load. In this instance, the interface display 50 displays a prompt for information and the buttons 52, 54, 56 and 58 are configured to provide data entry functions. In this situation, the user can adjust the information displayed in the interface display 50 and enter responses to the prompts. More specifically, the user can change the response to the prompt using the scroll up button 52 or the scroll down button 54. For example, a user can toggle a Boolean value from true to false or from yes to no, by actuating either of buttons 52 or 54. In another example, the user can increase or decrease a numerical answer displayed in the prompt by actuating the scroll up button 52 or the scroll down button 54. In still another example, the user can scroll up or down a list of answers using the scroll up button 52 or the scroll down button 54. In addition, the user can enter the currently displayed response to the prompt by actuating the enter button 56. The user can also exit the prompt without responding to the prompt by actuating the escape key 58. Thus, the particular arrangement and function of the user interface 30 provides users with sundry advantages over conventional UPS interfaces.

The user interface shown in FIG. 2 may be implemented in other examples using different configurations of buttons, different styles of buttons and using display screens of different sizes. In one example, the interface display 50 is a touch screen interface upon which the buttons are rendered for user input. In this example, the sizes, colors and arrangement of the buttons can be altered based on a number of factors including, among others, the level of expertise of the user, the availability of the buttons to accept input and the current status of the UPS. Thus examples in accordance with the present invention allow the user interface 30 to be tailored to the requirements of a variety of users.

Although an on-line UPS has been described herein, the methods and systems described herein may be applied to other types of UPSs as well. For example, the UPS may be a line interactive UPS, which is similar to off-line and on-line UPSs in that it switches to battery power when a blackout occurs. However, when a power line sag or swell occurs, at least one type of line interactive UPS activates a tap switching voltage regulation circuit to stabilize the output voltage continuously, without consuming battery power. The tap switching voltage regulation circuit often includes an automatic voltage regulation (AVR) transformer, which operates in single boost, double boost or trim modes. One example of a line interactive UPS may be found in U.S. patent application Ser. No. 12/360,648, entitled "System and Method for Limiting Losses in an Uninterruptible Power Supply," filed Jan. 27, 2009, which is hereby incorporated herein by reference in its entirety.

Figure 3:
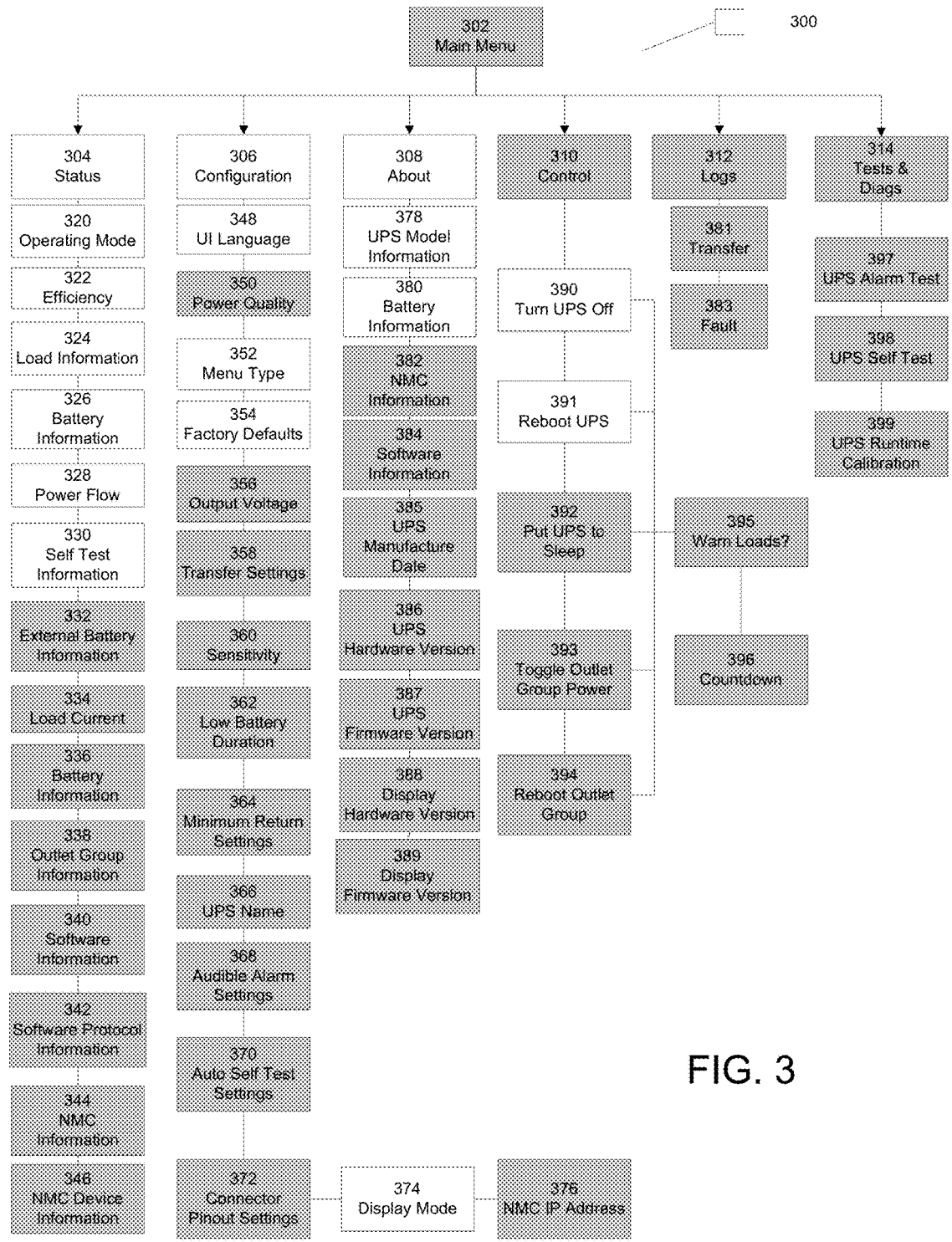
FIG. 3 shows an example of an adaptive user interface structure in accordance with the present invention.

Some examples in accordance with the present invention relate to interface structures that change based on the characteristics of the environment in which a UPS employing the interface structures operates. In these examples, the UPS 10 may manipulate user interface elements to suit the level of expertise of users and accommodate particular UPS configurations. When determining a particular adaption to perform, the UPS 10 may test for the presence or absence of one or more specific operational conditions. FIG. 3 illustrates an example of an adaptive interface structure 300 in accordance with the present invention.

In the example shown, the UPS 10 activates, deactivates and modifies some of the elements of the adaptive interface structure 300 based on a variety of information. In this example, the information used to adapt the adaptive interface structure 300 includes, among other information, operational parameters stored in the data storage 32, peripherals attached to the UPS 10 and software installed on remote devices coupled to the UPS 10 via the external system interface 34. In addition, in the example shown, some elements, which are characterized herein as common elements, are not modified by the UPS and, therefore, are displayed within the adaptive interface structure 300 in any UPS operational environment. As shown, the adaptive interface structure 300 includes a main menu 302, a status screen 304, a configuration screen 306, an about screen 308, a control screen 310, a logs screen 312 and a test and diagnostics screen 314.

In the illustrated example, the main menu 302 provides access to common screens 304, 306 and 308. If the UPS 10 determines that the menu type parameter has been set to a standard value, the UPS 10 deactivates screens 310, 312 and 314. As is discussed further below, the menu type parameter is an operational parameter that can be configured by a user during the configuration of the UPS 10. Conversely, if the UPS 10 determines that the menu type parameter has been set to an advanced value, the UPS activates screens 310, 312 and 314.

In this example, the status screen 304 provides access to various screens that display a variety of information regarding the status of the UPS 10. As shown, the status screen 304 provides access to common screens 320, 322, 324, 326, 328 and 330. If the UPS 10 determines that the menu type parameter has been set to the advanced value, the UPS 10 activates screens 334, 336 and 338. Conversely, if the UPS 10 determines that the menu type parameter has been set to the standard value, the UPS 10 deactivates screens 334, 336 and 338. In addition, if the UPS 10 determines that it is connected to an external battery, the UPS 10 activates screen 332. Furthermore, if the UPS 10 determines that it is connected to an NMC, the UPS 10 activates screen 344. Further still, if the UPS 10 determines that it is connected to an external device that includes installed software, the UPS activates screen 340.

In some examples, the UPS 10 activates certain screens if specific combinations of characteristics are present in its current operational environment. For example, with continuing reference to FIG. 3, the UPS 10 activates screen 342 if software is installed on a device coupled to the UPS 10 and the menu type parameter has been set to the advanced value. In another example, the UPS 10 activates screen 346 if an NMC is installed in the UPS and the menu type parameter has been set to the advanced value. In other examples, screens may be activated if certain peripherals are connected to the UPS 10 and the menu type parameter has been set to the advanced value. The UPS 10 may consider any number of characteristics when adapting the adaptive interface structure 300 to a specific operational environment and examples in accordance with the present invention are not limited to specific structures or sets of characteristics.

Referring again to FIG. 3, the configuration screen 306 provides access to several screens that allow a user to configure a variety of parameters that control the operation of the UPS 10. As shown, the configuration screen 306 provides access to common screens 348, 352, 354 and 374. If the UPS 10 determines that the menu type parameter has been set to the advanced value, the UPS 10 deactivates screen 350 and activates screens 356, 358, 360, 362, 364, 366, 368, 370 and 372. Conversely, if the UPS 10 determines that the menu type parameter has been set to the standard value, the UPS 10 activates screen 350 and deactivates screens 356, 358, 360, 362, 364, 366, 368, 370 and 372. In addition, if the UPS 10 determines that it is connected to an NMC and the menu type parameter is set to the advanced value, the UPS 10 activates screen 376.

According to the illustrated example, the about screen 308 allows users to access a variety of screens that display information concerning components of UPS 10. As depicted, the about screen 308 provides access to common screens 378 and 380. If the UPS 10 determines that the menu type parameter has been set to the advanced value, the UPS 10 activates screens 385, 386, 387, 388 and 389. Additionally, if the UPS 10 determines that an NMC is installed within the UPS 10, the UPS 10 activates screen 382. Further, if the UPS 10 determines that software is installed on a connected external device, the UPS 10 activates screen 384.

As shown in FIG. 3, the control screen 310 provides users with access to screens that control the operation of the UPS 10. As depicted, the control screen 310 provides access to common screens 390 and 391. If the UPS 10 determines that the menu type parameter has been set to the advanced value, the UPS 10 activates screens 392, 393, 394, 395 and 396.

In the example shown, the logs screen 312 provides access to logged event information. The UPS 10 activates screens that provide logging information if it determines that the menu type parameter has been set to the advanced value. If, however, the UPS 10 determines that the menu type parameter has been set to the standard value, the UPS 10 deactivates the log screens.

According to the example shown in FIG. 3, the test and diagnostics screen 314 provides access to screens that allow a user to verify that the UPS 10 is in proper operational condition. If the UPS 10 determines that the menu type parameter has been set to the advanced value, the UPS activates screens 397, 398 and 399. Conversely, if the UPS 10 determines that the menu type parameter has been set to the standard value, the UPS 10 deactivates screens 397, 398 and 399.

The various screens depicted in FIG. 3 function as follows. The behavior of the main menu screen 302 depends on the value of the menu type parameter and a display mode parameter. If the UPS 10 determines that the display mode parameter is set to the auto off value, then the UPS 10 adapts the main menu screen 302 to display a blank screen after a predetermined period of time. In the alternative, if the UPS 10 determines that the display mode parameter is set to the always on value, the UPS 10 adapts the main menu screen 302 to continuously display information. In either case, the information displayed by the main menu screen 302 is affected by the value of the menu type parameter as discussed below.

For example, if the UPS 10 determines that the menu type parameter is set to the standard value then the UPS 10 adapts the main menu screen 302 display an indication of the remaining power left in the battery 18 and an indication of the amount of load on the UPS 10. If the UPS 10 determines that the menu type parameter is set to the advanced value then the main menu screen 302 is adapted to cycle through a set of six screens. These screens display a set of indications including indications for the currently utilized source of power for the UPS 10, e.g. on-line or on-battery, the remaining power in the currently utilized power source, the efficiency of the UPS 10, current status of the outlet groups of the UPS 10, input and output power, the amount of power being drawn by the load, the remaining power capacity, the amount of remaining runtime of the battery and the reason for the last transfer of power between power sources. From the main menu screen 302, a user can move through any of screens 304, 306, 308, 310, 312 and 314 that are active by actuating the scroll up button 52 and the scroll down button 54. In addition, a user can change position in the adaptive interface structure 300 to one of screens 304, 306, 308, 310, 312 and 314 by actuating the enter button 56 while the desired screen is displayed.

In the example shown in FIG. 3, each of screens 304, 306, 308, 310, 312 and 314 allow a user to navigate to the screens positioned beneath them in the adaptive interface structure 300. For example, a user currently positioned at the status screen 304 can move through any of screens 320, 322, 324, 326, 328, 330, 332, 334, 336, 338, 340, 342, 344 and 346 that are active by actuating the scroll up button 52 and the scroll down button 54. Furthermore, a user can change position in the adaptive interface structure 300 to any of screens 320, 322, 324, 326, 328, 330, 332, 334, 336, 338, 340, 342, 344 and 346 that are active by actuating the enter button 56 while the desired screen is displayed. Also, from the status screen 304, the user can move one level up in the adaptive interface structure 300, i.e. to the main menu screen 302, by actuating the escape key 58. Each of screens 306, 308, 310, 312 and 314 provide analogous navigation of the active screens positioned beneath them in the adaptive interface structure 300.

The screens that are accessible via the status screen 304, as shown in FIG. 3, operate as follows. The operating mode screen displays an indication the currently utilized power source, e.g. on-line or on-battery, and the remaining power available from the currently utilized source. The efficiency screen 322 displays an indication of the efficiency with which the UPS is operating. The load information screen 324 displays an indication of real power consumed by the load measured in Watts and the apparent power to the load measured in Volt-Amps. The battery information screen displays an indication of the remaining battery capacity and runtime. The power flow screen 328 displays an indication of the power input into the UPS 10 and output from the UPS 10 measured in volts and hertz and the reason for the last transfer of power from on-line to on-battery. The self test information screen 330 displays an indication of the results of the most recently executed UPS self test. The external battery information screen 332 displays an indication of the presence of any external battery packs coupled to the UPS 10. The load current screen 334 displays an indication of the current provided to the load in Amps. The battery information screen 336 displays an indication of the battery voltage. The outlet group information screen 338 displays an indication of the power status, e.g. "on," "off," "rebooting," etc. . . . , of each outlet group. The software information screen 340 displays the Internet Protocol (IP) address used by software installed on remote devices coupled to the UPS 10. The software protocol information screen 342 displays an indication of the physical connection type, for example network, serial, universal serial bus, etc. . . . , and the protocol, for example micro-link, used by the software. The NMC information screen 344 displays the IP address, IP subnet mask and default gateway used by the NMC. The NMC device information screen 346 displays an indication of the probe temperature, probe humidity and contact sensor status of the NMC.

In the illustrated example, the screens that are accessible via the configuration screen 306 allow the user to modify the default configuration of the UPS 10. The default configuration of the UPS 10 may associate a set of default values with a set of operational parameters. In one example, each of the screens accessible via the configuration screen 306 is associated with at least one operational parameter of the UPS 10 and allows the user to review a set of values that are assignable to the associated operational parameter. The values assigned to the operational parameters may control the operation of the UPS 10. In one example, the user can move through the set of values by actuating the scroll up button 52 and the scroll down button 54. In addition, the user can assign the currently displayed value or values to the associated operational parameter or parameters by actuating the enter button 56. In response, the UPS 10 can store the values assigned to the operational parameters in data storage 32. Also, the user can change position in the adaptive interface structure 300 to the configuration screen 306, without changing the value assigned to the associated operational parameter, by actuating the escape key 58.

In the example shown in FIG. 3, the screens that are accessible via the configuration screen 306 provide access to a variety of operational parameters. The UI language screen 348 prompts the user to select the language in which the UPS 10 will display information. The power quality screen 350 prompts the user to indicate the quality of power, for example "good," "fair" or "poor," supplied to the UPS 10. In response, the UPS 10 determines a plurality of values to assign to a plurality of operational parameters. For example, the UPS 10 can assign, based on the indication of power quality, values to upper and lower power transfer points, a value to sensitivity to changes in power, a value to tolerance shown to deviations from a benchmark frequency and a value to beeper duration. Additionally, in an example where the UPS 10 is a line interactive UPS, the UPS 10 can assign, based on the indication of power quality, a value to the AVR operating mode. AVR operating modes may include, among other operating modes, green, single boost, double boost and trim modes.

In other examples, the UPS 10 can determine other values for these and other operational parameters in response to information entered by the user. In one example, the UPS 10 can adjust the values assigned to the upper and lower transfer points, the sensitivity and the frequency tolerance based on an indication that the user wishes to prolong the useful lifespan of the battery. In another example, the UPS 10 can assign different values to these operational parameters based on an indication that the user wishes to prolong the duration of time that the battery 18 can power the load, i.e. the runtime of the battery. According to another example, the UPS 10 can adjust the frequency with which the UPS 10 conducts a self test in response to a user indication that the user wishes to prolong the useful lifespan of the battery. Thus examples in accordance with the present invention provide technical expertise to standard users by tailoring the complex configuration of the UPS 10 in response to readily ascertainable information regarding the operational environment of the UPS 10.

Returning to FIG. 3, the menu type screen 352 prompts the user to select the type of interface structure and content displayed by the UPS 10. In one example, the values that are assignable to the menu type parameter include a standard value and an advanced value. As discussed above, the adaptive interface structure 300 is adapted based on a variety of information including the value assigned to the menu type parameter. More specifically, in response to the menu type parameter being assigned a specific value some screens included in the adaptive interface structure 300 are deactivated and others are activated. In addition, some screens are simplified with less dense and easier to read information. For example, some abbreviations are expanded and some information, such as indications of deactivated screens, is removed from screens that would display the information under a different configuration. Once values have been established for the various operational parameters, the UPS 10 can apply the values to control its operational behavior. For instance, the controller 16 can adapt the interface structure to comply with the value assigned to the menu type parameter or adjust the behavior of the user interface 30 to comply with the value assigned to the display mode parameter.

Continuing with the example illustrated in FIG. 3, the factory defaults screen 354 allows the user to revert the configuration of the UPS 10 to a default configuration established by the manufacturer. The output voltage screen 356 prompts the user to specify the voltage output by the UPS 10. The transfer settings screen 358 prompts the user to provide the upper and lower transfer points. The sensitivity screen 360 prompts the user to supply the sensitivity to power changes used by the UPS 10. The low battery duration screen 362 prompts the user to indicate the amount of time during which the UPS 10 will indicate that the remaining battery power is low. The minimum return settings screen 364 prompts the user to indicate the amount of charge required to be in the battery prior to returning from a shutdown of the UPS 10 and the amount of elapsed time that on-line power must be available to the UPS 10 prior to returning from a shutdown of the UPS 10. The UPS name screen 366 prompts the user to enter a name for the UPS. The audible alarm settings 368 screen prompts the user to specify if or when the UPS 10 sounds an audible alarm. The auto self test screen 370 prompts the user to provide an indication of how often the UPS 10 should performs an automatic self test. The connector pinout setting screen 372 prompts the user to supply the pinout settings for the external system interface 34. The display mode screen 374 prompts the user to specify the display mode parameter discussed above. The NMC IP address screen prompts the user to enter the IP address setting to be used by the NMC. In one example, these settings specify whether the NMC should lease an IP address from a DHCP server or that the NMC has a static IP address.

In the example shown in FIG. 3, the screens that are accessible via the about screen 308 allow the user to review configuration management information regarding the components of the UPS 10. The UPS model information screen 378 displays an identifier of the model and the serial number of UPS 10. The battery information screen 380 displays the date the battery was installed, an approximate date by when the battery will need to be replaced and an identifier of the model of the battery. The NMC information screen 382 displays an identifier of the model, serial number, hardware version, manufacture date, MAC Address, application firmware name, application firmware version, operating system name and operating system version of the NMC.

The software information screen 384 displays information regarding software that interacts with the UPS 10. This software may include any process that is executed on computer systems that are coupled to the UPS 10. The configuration management information displayed by the software information screen 384 may include, among other information, a name or other identifier of the software and version information applicable to the software. Examples of the information displayed by the software information screen 384 include operating system name and version, e.g. Microsoft Windows 2000, virtual machine name and version, e.g. Java 1.6, and application software name and version, e.g. Power Chute Local Agent v9.1.

In the example shown in FIG. 3, the UPS manufacture date screen 385 displays the date that the UPS 10 was manufactured. The UPS hardware version screen 386 displays the version of the hardware that constitutes the UPS 10. The UPS firmware version screen 387 displays the version of the firmware installed on the UPS 10. The display hardware version screen 388 displays the version of the interface display 50. The display firmware version screen 389 displays the version of the firmware installed in the interface display 50.

Continuing the example shown in FIG. 3, the screens that are accessible via the control screen 310 allow the user to change the operational state of the UPS 10. In this example, the user can navigate to a particular control screen by using the scroll up button 52 and the scroll down button 54. The user may change position in the adaptive interface structure 300 to the currently displayed control screen by actuating the enter button 56. Once positioned at a particular control screen, the user may cause the UPS 10 to perform an action associated with the screen by again actuating the enter button 56. In response, the UPS 10 performs the confirmed action. Conversely, when positioned at a particular control screen, the user may abort the action and return to the control screen 310 by actuating the escape button 56.

In the example shown in FIG. 3, the control screens that are accessible via the control screen 310 provide access to a variety of actions that change the operational state of the UPS 10. The turn UPS off screen 390 allows the user to initiate a powering down of the UPS 10. The reboot UPS 391 allows the user to initiate a power cycling of the UPS 10. The put UPS to sleep screen 392 allows the user to cause the UPS 10 to enter a reduced power consumption mode in which the UPS 10 adjusts the power made available to the load in proportion to the power demanded by the load. The toggle outlet group power screen 393 gives the user the ability to turn power supplied to particular outlet groups on or off. The reboot outlet group screen 394 provides the user with the ability to cycle the power to particular outlet groups.

Each of screens 390, 391, 392, 393 and 394 allow the user to effect changes in the operational state of the UPS 10 that affect the load. The warn loads screen 395, which is displayed by the UPS 10 after confirmation of a request facilitated by any of screens 390-394, allows the user to cause the UPS notify the elements of the load of the eminent operational state change. The countdown screen 396 displays a timed countdown until each element of the requested operational state change is completed by the UPS 10.

As depicted in FIG. 3, the log screens that are accessible via the logs screen 312 provide access to historical performance information related to the UPS 10. Once the logs screen 312 is selected via the enter button 56, the user can navigate to screens 381 and 383 using the scroll up button 52 and the scroll down button 54. The transfer log screen 381 displays the reason for the last ten transfers of power from on-line power to on-battery power. The fault log screen 383 displays the reason for the last three instances when the UPS 10 was powered down.

Continuing the example shown in FIG. 3, the screens that are accessible via the tests and diagnostics screen 314 allow the user to test and recalibrate the UPS 10. In this example, the user can navigate to a particular screen by using the scroll up button 52 and the scroll down button 54. The user may change position in the adaptive interface structure 300 to the currently displayed screen by actuating the enter button 56. Once positioned at a particular screen, the user is prompted to confirm the currently displayed test or diagnostic by again actuating the enter button 56. In response, the UPS 10 performs the currently displayed test or diagnostic. Conversely, when positioned at a particular screen, the user can abort the currently displayed test or diagnostic and return to the tests and diagnostics screen 314 by actuating the escape button 56.

According to the example of FIG. 3, the tests and diagnostics screen 314 allows the user to access several test and diagnostic screens. The UPS alarm test 397 allows the user to trigger a test of the alarm components of the UPS 10. These alarm components may include audible alarms and electronic notifications transmitted via a variety of protocols such as TCP/IP, SNMP and MIME. The UPS self test screen 398 allows the user to initiate a UPS self test. The UPS runtime calibration screen 399 allows the user to recalibrate the estimated runtime of the battery 18, i.e. the amount of time that the UPS 10 can supply the load with sufficient power using the battery 18.

In another example, the UPS 10 exposes the interface functionality discussed herein through the external system interface 34. In this example, the UPS 10 provides an interface application program interface (API) that includes a set of standards for invoking the interface functionality of the UPS 10. The specific interface functions that may be invoked using the interface API include any interface functionality provide by the UPS 10. Thus, using an external system that is configured to interact with the UPS 10 via the interface API, the user can, for example, shutdown the UPS 10, retrieve or store values for specific operational parameters in the data storage 32, or display information on the interface display 50 or on the external system.

It should be appreciated that even though examples in accordance with the present invention are described herein for use with an on-line UPS, some examples may be used with other UPS topologies including off-line and line interactive UPS's. Further, at least some examples described herein may be used with power devices other than UPS's including, but not limited to, outlet strips, power converters, line conditioners, surge protectors, power conditioners, Power Distribution Units (PDU) and Rack PDUs.

UI Processes

Figure 4:
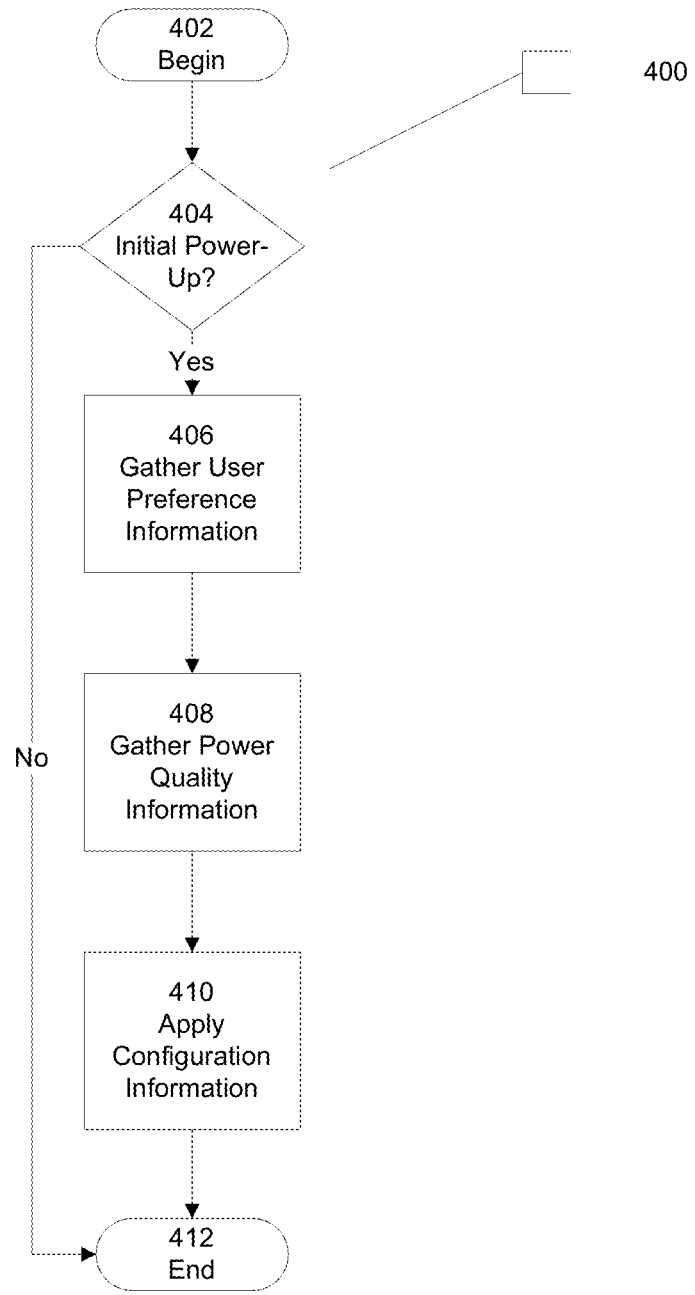
FIG. 4 is a process diagram of a process for directing a user to configure a UPS in accordance with the present invention.

Various examples in accordance with the present invention provide processes for directing configuration of a UPS with a user interface including a display. In one example, the user is guided through an initial configuration of UPS 10 during initial power-up of the UPS 10. FIG. 4 illustrates one such process 400 that includes acts of determining if the UPS 10 is performing an initial power-up, gathering user preference information, gathering power quality information and applying configuration information to the operation of the UPS 10. Process 400 begins at 402.

In act 404, a determination is made as to whether an initial power-up is being performed. According to various examples, a UPS makes this determination. In one example, the UPS that makes this determination is a UPS arranged and configured in accordance with the UPS 10, as described above. In this example, the UPS 10 determines whether an initial power-up is being performed by detecting the presence of a configuration request that indicates the current power-up is an initial power-up. If the UPS successfully detects such a configuration request, process 400 proceeds to 406; otherwise process 400 proceeds to 412.

In act 406, user preference information is gathered. According to various examples, a UPS gathers this information from a user. Acts in accordance with these examples are discussed below with reference to FIG. 5.

In act 408, power quality information is gathered. According a variety of examples, a UPS gathers this information from a user. Acts in accordance with these examples are discussed below with reference to FIG. 6.

In act 410, the values of one or more operational parameters are applied. According to some examples, a UPS applies these operational parameter values and thereby alters its operational characteristics. Acts in accordance with these examples are discussed below with reference to FIG. 7.

Process 400 ends at 410. Process 400 enables a UPS to assist users in configuring operational parameters of the UPS. By so doing, examples aid users in tailoring UPS operational behavior to the particular characteristics of its operational environment.

Figure 5:
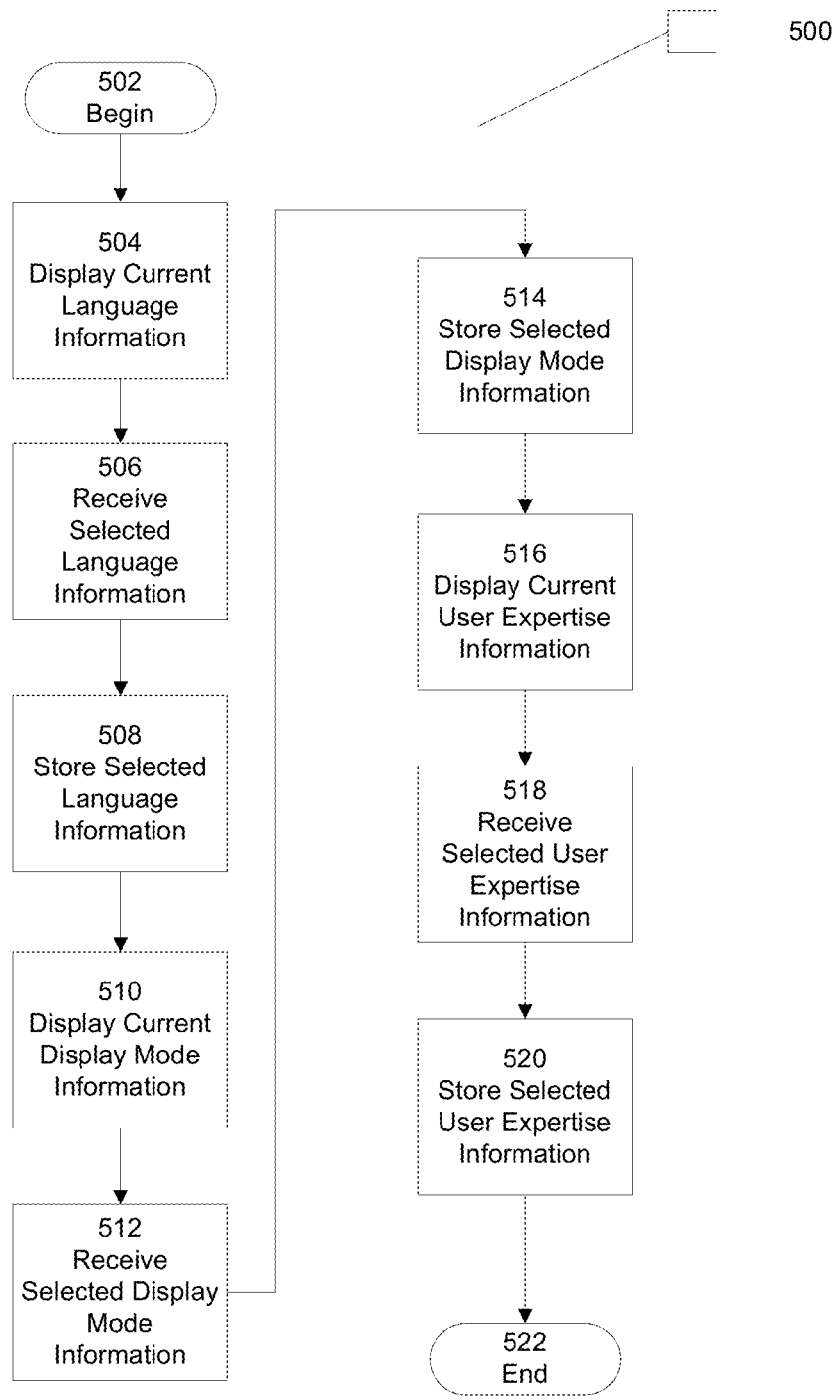
FIG. 5 is a process diagram of a process for gathering user preference information in accordance with the present invention.

Various examples provide processes for a UPS to gather user preference information. FIG. 5 illustrates one such process 500 that includes acts of displaying current language information, receiving selected language information, storing selected language information, displaying current display mode information, receiving selected display mode information, storing selected display mode information, displaying current user expertise information, receiving selected user expertise information and storing selected use expertise information. Process 500 begins at 502.

Figure 12:
FIG. 12 depicts an example of a UPS displaying an indication of a value of an operational parameter in accordance with the present invention.
Figure 13:
FIG. 13 shows an example of a UPS displaying an indication of a value of an operational parameter in accordance with the present invention.
Figure 14:
FIG. 14 illustrates an example of a UPS displaying an indication of a value of an operational parameter in accordance with the present invention.

In act 504, a UPS displays an indication of a language that is currently in use via its user interface. In one example, the UPS that displays this indication is a UPS arranged and configured in accordance with the UPS 10, as described above. In this example, the UPS 10 displays the indication based on the current value of the language parameter in interface display 50. The value of the language parameter may indicate that any language understandable by humans is currently in use by the UPS 10 including, among other languages, English, French and Spanish. FIGS. 12, 13 and 14 illustrate the UPS 10 displaying indications of these language values.

In act 506, the UPS receives an indication of a language to be used by the user interface of the UPS. In one example, the UPS that receives this indication is a UPS arranged and configured in accordance with the UPS 10, as described above. In this example, the UPS 10 receives the indication of the language via user interface 30.

In act 508, the UPS stores a value signifying the indicated language in a data storage medium. In one example, the UPS that stores this value is a UPS arranged and configured in accordance with the UPS 10, as described above. In this example, the UPS 10 stores the value in data storage 32 as the language parameter.

Figure 20:
FIG. 20 illustrates an example of a UPS displaying an indication of a value of an operational parameter in accordance with the present invention.
Figure 21:
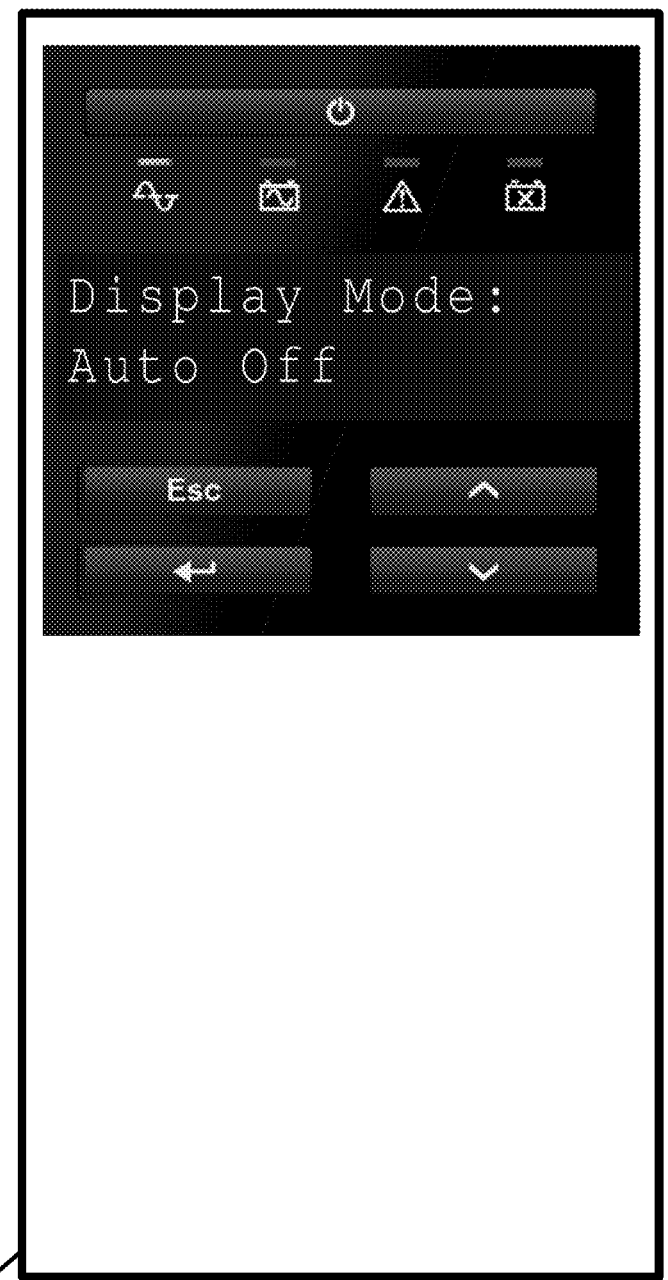
FIG. 21 depicts an example of a UPS displaying an indication of a value of an operational parameter in accordance with the present invention.

In act 510, a UPS displays an indication of a display mode that is currently in use via its user interface. In one example, the UPS that displays this indication is a UPS arranged and configured in accordance with the UPS 10, as described above. In this example, the UPS 10 displays the indication based on the current value of the display mode parameter in interface display 50. As discussed above, the value of the display mode parameter may be auto off or always on. FIGS. 20 and 21 illustrate the UPS 10 displaying indications of these display mode values.

In act 512, the UPS receives an indication of a display mode to be used by the user interface of the UPS. In one example, the UPS that receives this indication is a UPS arranged and configured in accordance with the UPS 10, as described above. In this example, the UPS 10 receives the indication of the display mode via user interface 30.

In act 514, the UPS stores a value associated with the indicated display mode in a data storage medium. In one example, the UPS that stores this value is a UPS arranged and configured in accordance with the UPS 10, as described above. In this example, the UPS 10 stores the value in data storage 32 as the display mode parameter.

Figure 18:
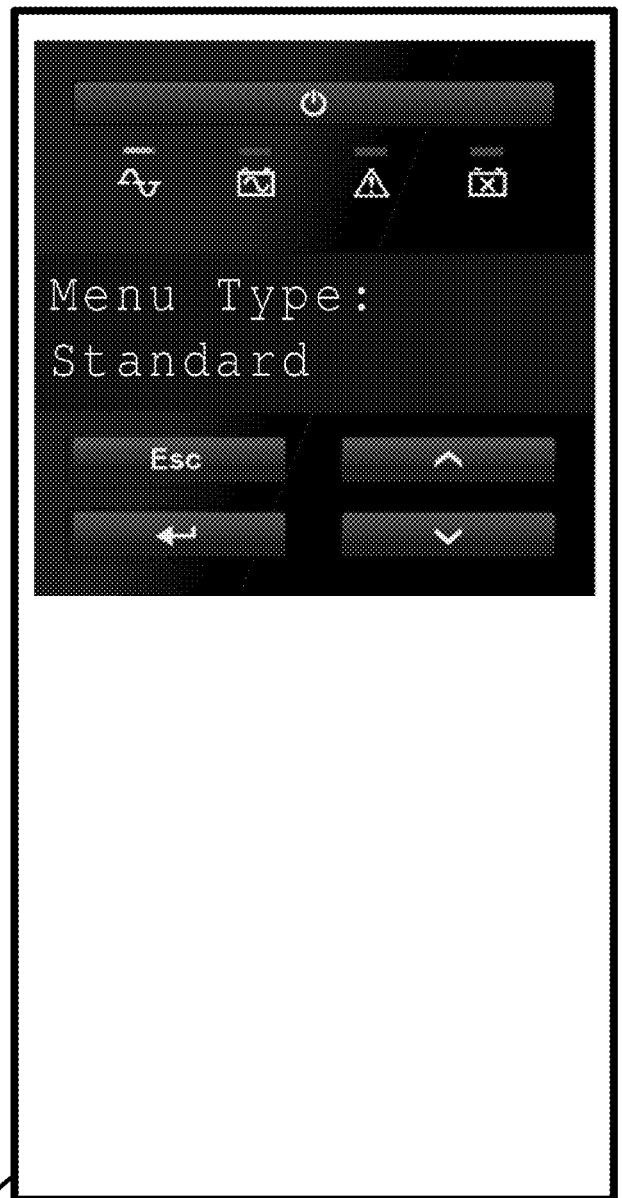
FIG. 18 depicts an example of a UPS displaying an indication of a value of an operational parameter in accordance with the present invention.
Figure 19:
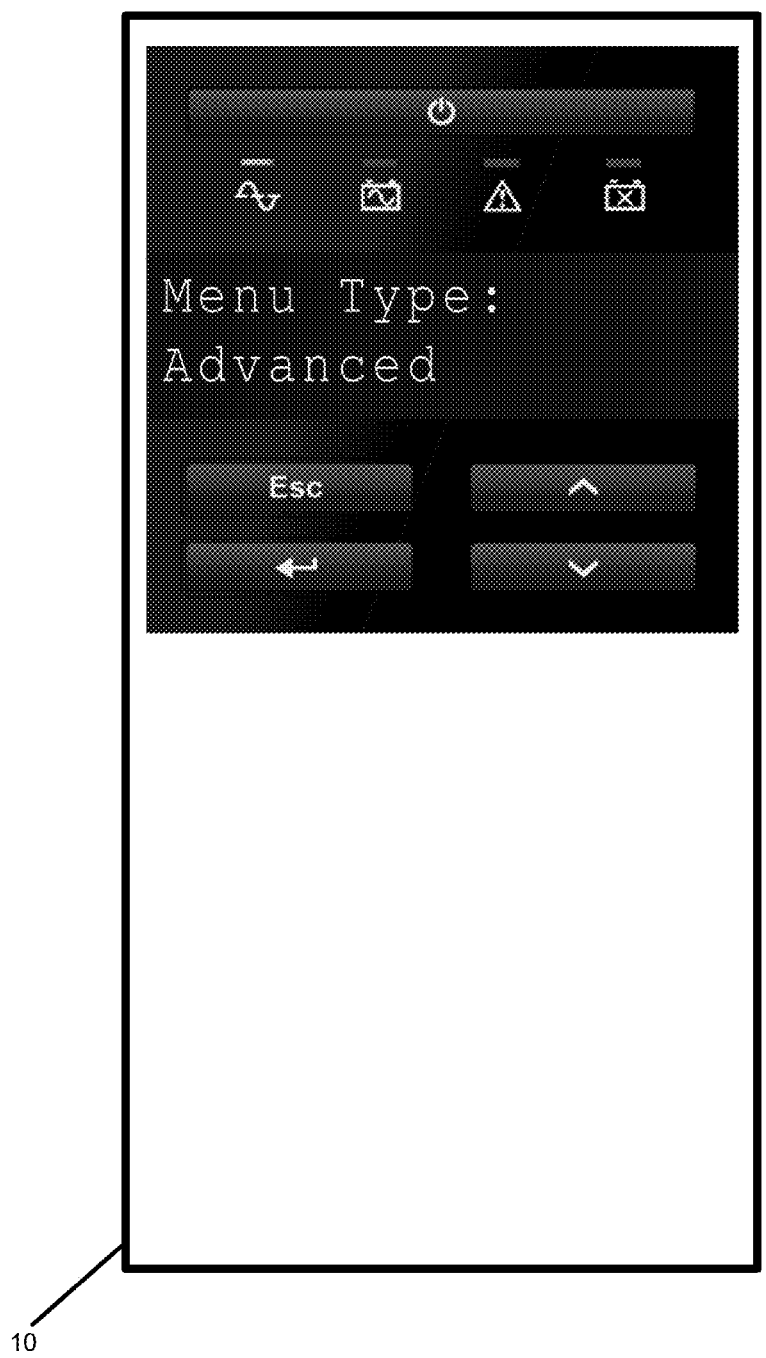
FIG. 19 shows an example of a UPS displaying an indication of a value of an operational parameter in accordance with the present invention.

In act 516, a UPS displays an indication of a level of expertise of the user. In one example, the UPS that displays this indication is a UPS arranged and configured in accordance with the UPS 10, as described above. In this example, the UPS 10 displays the indication based on the current value of the menu type parameter in interface display 50. Also, as discussed above in this example, the value of the menu type parameter may be either standard or advanced. FIGS. 18 and 19 illustrate the UPS 10 displaying indications of these levels of user expertise.

In act 518, the UPS receives an indication of a level of expertise of the user via the user interface of the UPS. In one example, the UPS that receives this indication is a UPS arranged and configured in accordance with the UPS 10, as described above. In this example, the UPS 10 receives the indication of the language via user interface 30.

In act 520, the UPS stores a value signifying the indicated level of user expertise in a data storage medium. In one example, the UPS that stores this value is a UPS arranged and configured in accordance with the UPS 10, as described above. In this example, the UPS 10 stores the value in data storage 32 and assigns the value to the menu type parameter.

Process 500 ends at 522.

Figure 6:
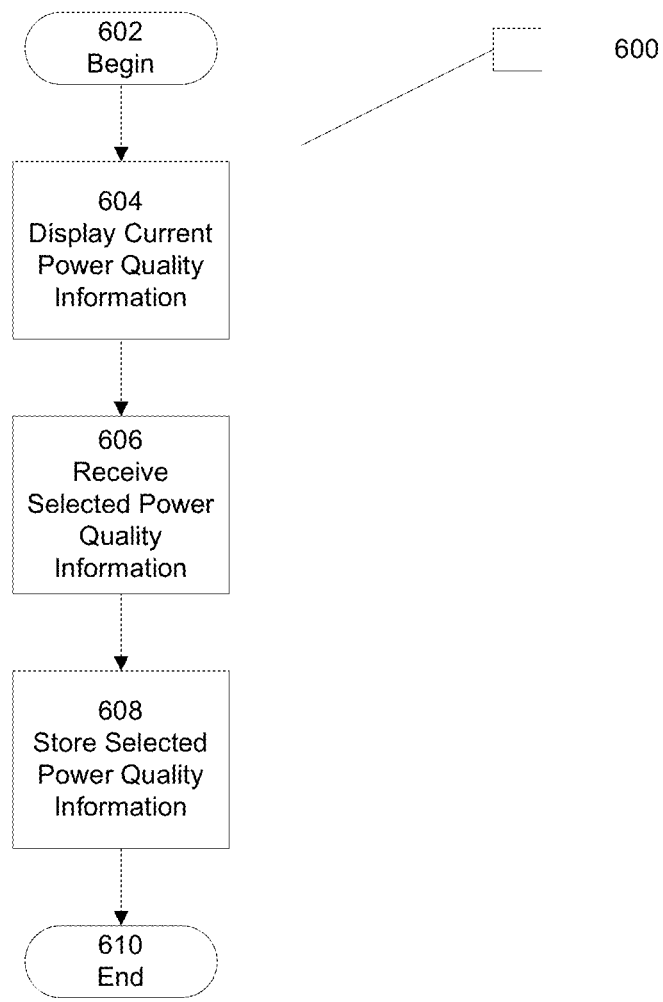
FIG. 6 is a process diagram of a process for gathering power quality information in accordance with the present invention.

Various examples provide processes for a UPS to gather power quality information. FIG. 6 illustrates one such process 600 that includes acts of displaying current power quality information, receiving selected power quality information and storing selected power quality information. Process 600 begins at 602.

Figure 15:
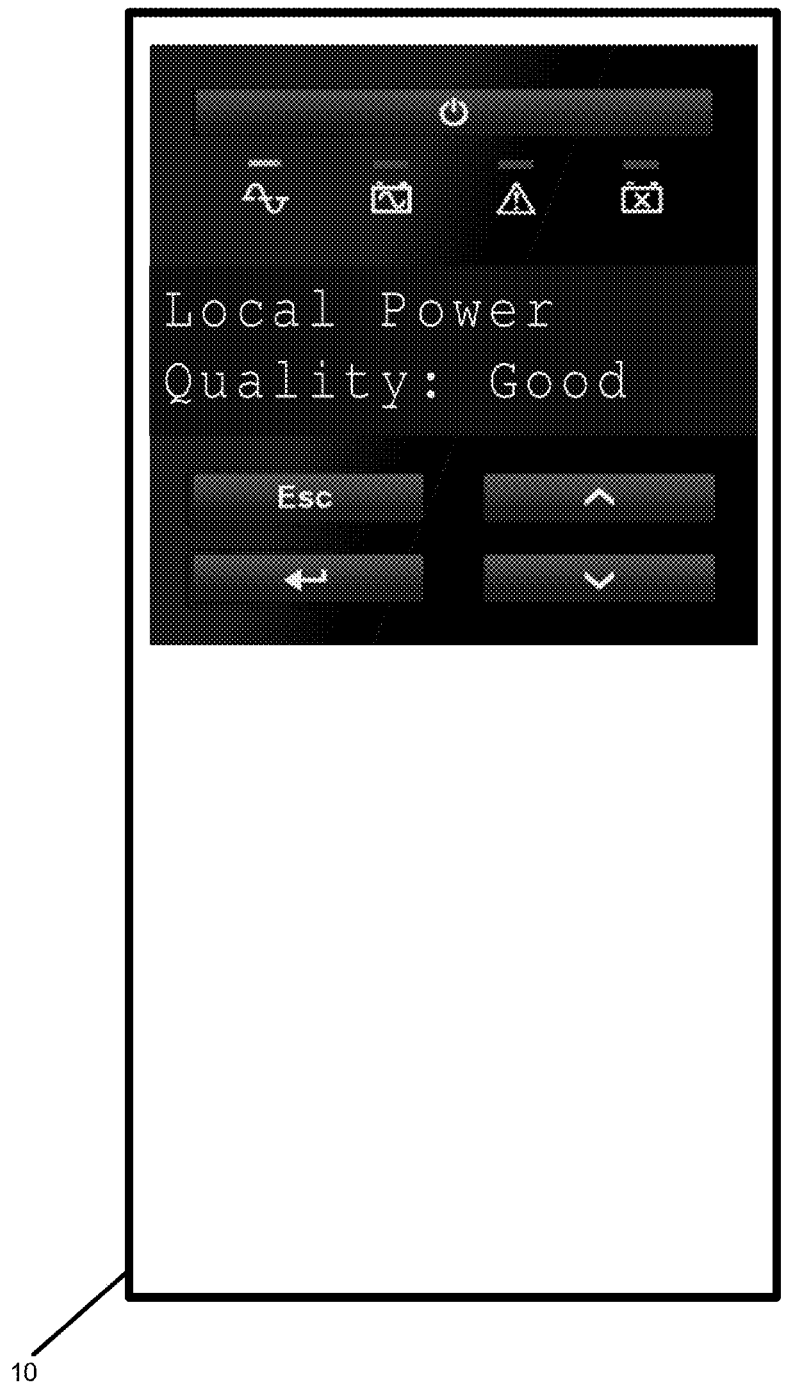
FIG. 15 depicts an example of a UPS displaying an indication of a value of an operational parameter in accordance with the present invention.
Figure 16:
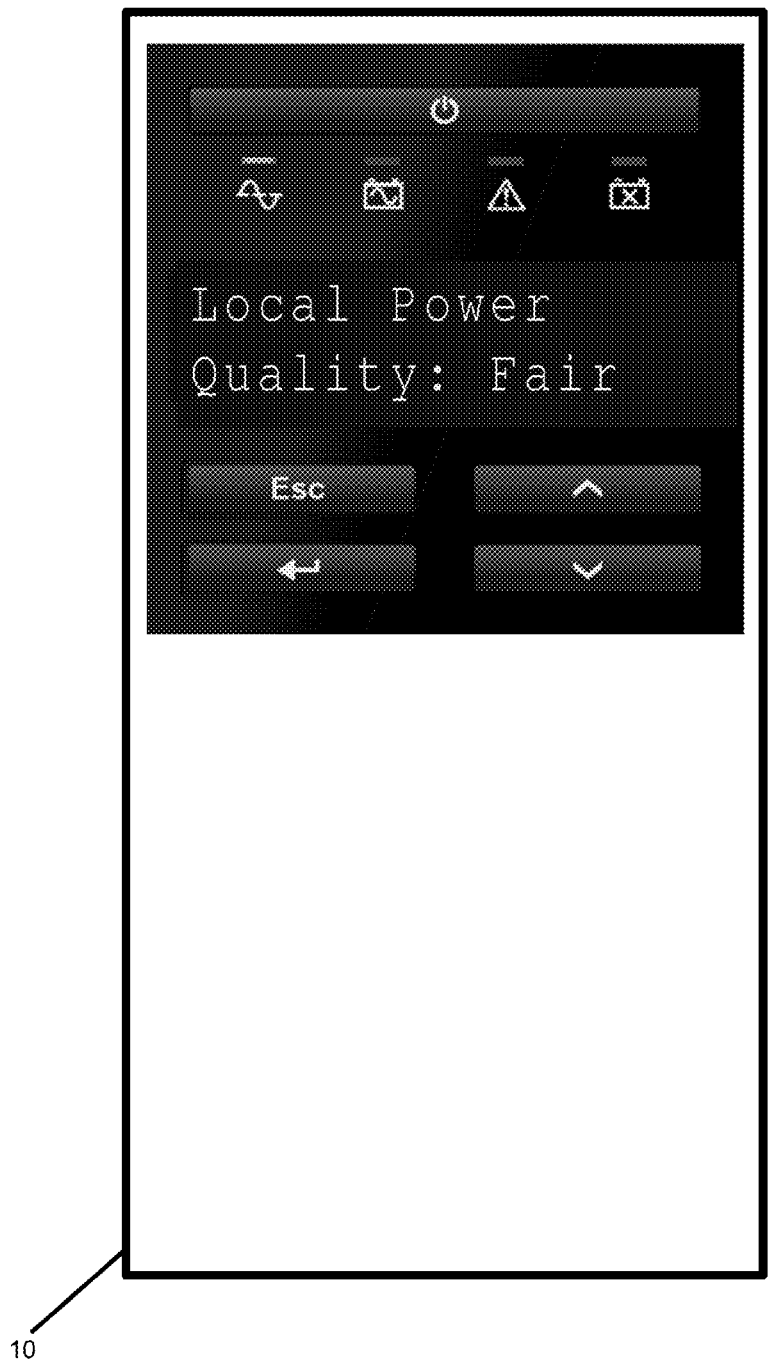
FIG. 16 shows an example of a UPS displaying an indication of a value of an operational parameter in accordance with the present invention.
Figure 17:
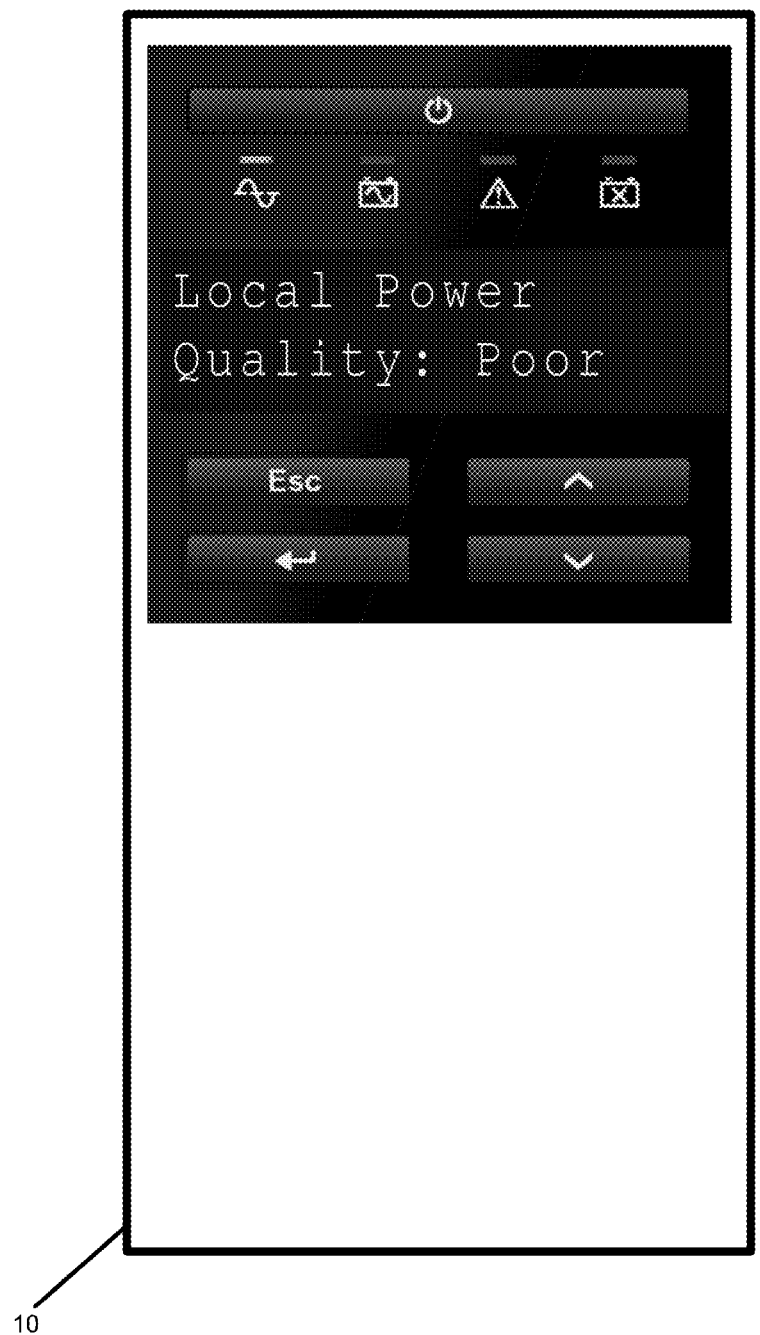
FIG. 17 illustrates an example of a UPS displaying an indication of a value of an operational parameter in accordance with the present invention.

In act 604, a UPS displays an indication of power quality via its user interface. In one example, the UPS that displays this indication is a UPS arranged and configured in accordance with the UPS 10, as described above. In this example, the UPS 10 displays the indication of power quality in interface display 50. Also, in this example, the indication may express the power quality as good, fair or poor. FIGS. 15, 16 and 17 illustrate the UPS 10 displaying indications of power quality.

In act 606, the UPS receives an indication of power quality supplied to the UPS. In one example, the UPS that receives this indication is a UPS arranged and configured in accordance with the UPS 10, as described above. In this example, the UPS 10 receives the indication of power via user interface 30.

In act 608, the UPS stores at least one value signifying the indicated power quality in a data storage medium. In one example, the UPS that stores this value is a UPS arranged and configured in accordance with the UPS 10, as described above. In this example, the UPS 10 stores the value in data storage 32 as a plurality of assigned values to a plurality of operational parameters, as discussed above.

Process 600 ends at 610.

Figure 7:
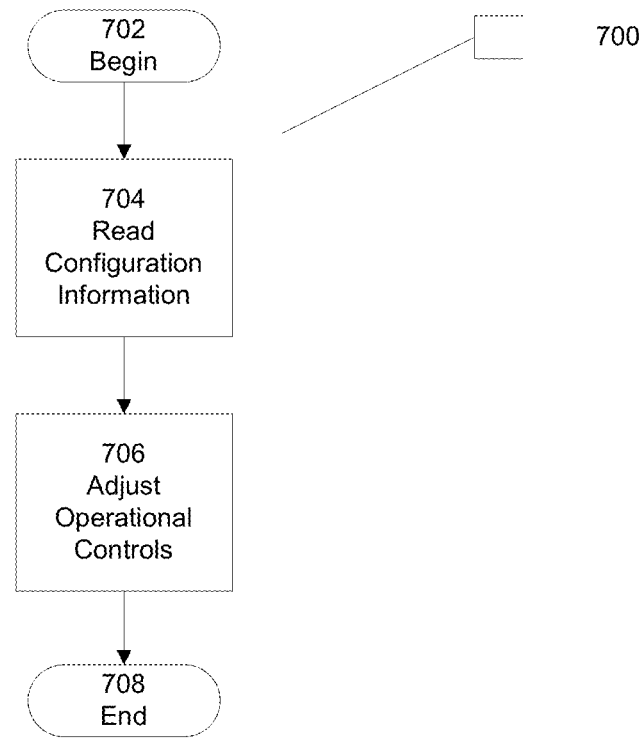
FIG. 7 is a process diagram of a process for applying configuration information of a UPS in accordance with the present invention.

Various examples provide processes for a UPS to apply values assigned to various operational parameters in order to alter the operational behavior of the UPS. FIG. 7 illustrates one such process 700 that includes acts of reading configuration information and applying configuration information to the operation of a UPS. Process 700 begins at 702.

In act 704, a UPS gathers values for configuration information that includes one or more operational parameters that are used to control the operational behavior of the UPS. In one example, the UPS that gathers these values is a UPS arranged and configured in accordance with the UPS 10, as described above. In this example, the controller 16 gathers the values for the operational parameters from data storage 32. The operational parameters for which values are gathered include the parameters assigned in response to the indication of power quality and user preference information.

In act 706, the UPS applies the configuration information to the operational behavior of the UPS. In one example, the UPS that applies the configuration is a UPS arranged and configured in accordance with the UPS 10, as described above. In this example, the controller 16 manages the operation of the UPS 10 to comply with the values assigned to the operational parameters. For instance, in one example, the controller 16 alters the interface structure employed by the user interface 30 to comply with the menu type parameter. In another example, the controller 16 alters the function of the user interface 30 to comply with the value assigned to the display mode parameter.

Process 700 ends at 708.

Figure 8:
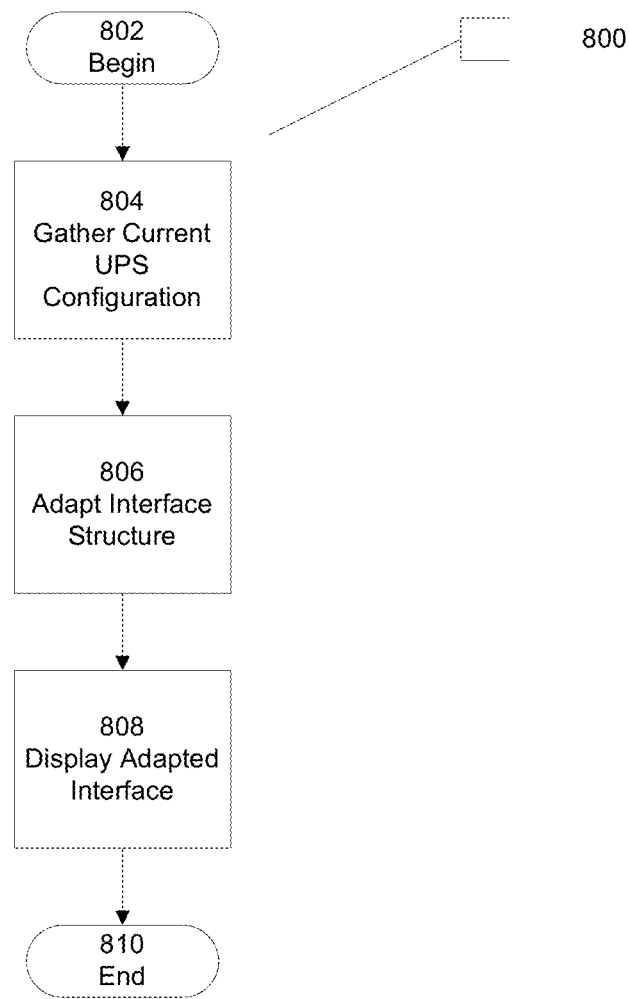
FIG. 8 is a process diagram of a process for adapting a user interface of a UPS in accordance with the present invention.

Various examples in accordance with the present invention provide processes for adapting the structure of a user interface to suit characteristics present in the operational environment of the UPS. In one example, the UPS performs a process that adapts the interface structure based on the configuration of the UPS. FIG. 8 illustrates one such process 800 that includes acts of gathering the current configuration of a UPS, adapting an interface structure of the UPS and displaying the adapted user interface. Process 800 begins at 802.

In act 804, the current configuration information regarding a UPS is gathered. According to various examples, a UPS gathers this information from a data storage medium included within the UPS. Acts in accordance with these examples are discussed below with reference to FIG. 9.

In act 806, the interface structure is adapted to the environment in which the UPS operates. According a variety of examples, the UPS performs this adaptation based on its current configuration information. Acts in accordance with these examples are discussed below with reference to FIG. 10.

In act 808, the adapted interface structure is displayed by the UPS. According to some examples, the UPS displays elements of the adapted interface structure using a visual display. Acts in accordance with these examples are discussed below with reference to FIG. 11.

Process 800 ends at 812. Process 800 enables a UPS to modify the manner in which it interacts with users according to the characteristics of the environment in which the UPS operates. Thus examples in accordance with the present invention provide for user interfaces with enhanced usability when compared to conventional UPS technology.

Figure 9:
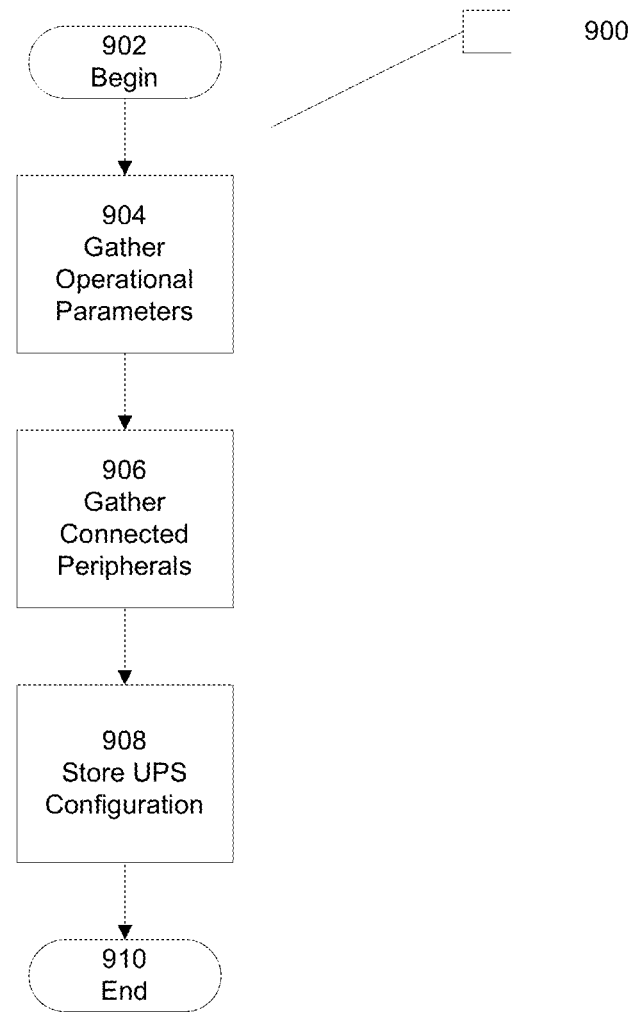
FIG. 9 is a process diagram of a process for gathering the current configuration of a UPS in accordance with the present invention.

Various examples in accordance with the present invention provide processes for a UPS to gather configuration elements used to adapt the interface structure of the UPS. FIG. 9 illustrates one such process 900 that includes acts of gathering operational parameters, gathering connected peripherals and storing the configuration elements. Process 900 begins at 902.

In act 904, a UPS gathers values for configuration information including one or more operational parameters that are used to adapt the interface structure of the UPS. In one example, the UPS that gathers these values is a UPS arranged and configured in accordance with the UPS 10, as described above. In this example, the UPS 10 gathers the values for the operational parameters from data storage 32. The operational parameters for which values are gathered include the language parameter, the menu type parameter and the display mode parameter.

In act 906, the UPS gathers information regarding any peripherals that are connected to the UPS. In one example, the UPS that receives this indication is a UPS arranged and configured in accordance with the UPS 10, as described above. In this example, the UPS 10 may gather peripheral information from various locations. For instance, the UPS 10 may gather this information from data storage 32. Alternatively, the UPS 10 may gather this information by searching for and detecting peripherals that are connected to the UPS 10.

In act 908, the UPS stores the gathered portions of the UPS configuration for further processing. In one example, the UPS that stores this value is a UPS arranged and configured in accordance with the UPS 10, as described above. In this example, the UPS 10 stores the gathered portions of the UPS configuration in data storage associated with the controller 16 such as the memory associated with the controller 16 or the data storage 32.

Process 900 ends at 910.

Figure 10:
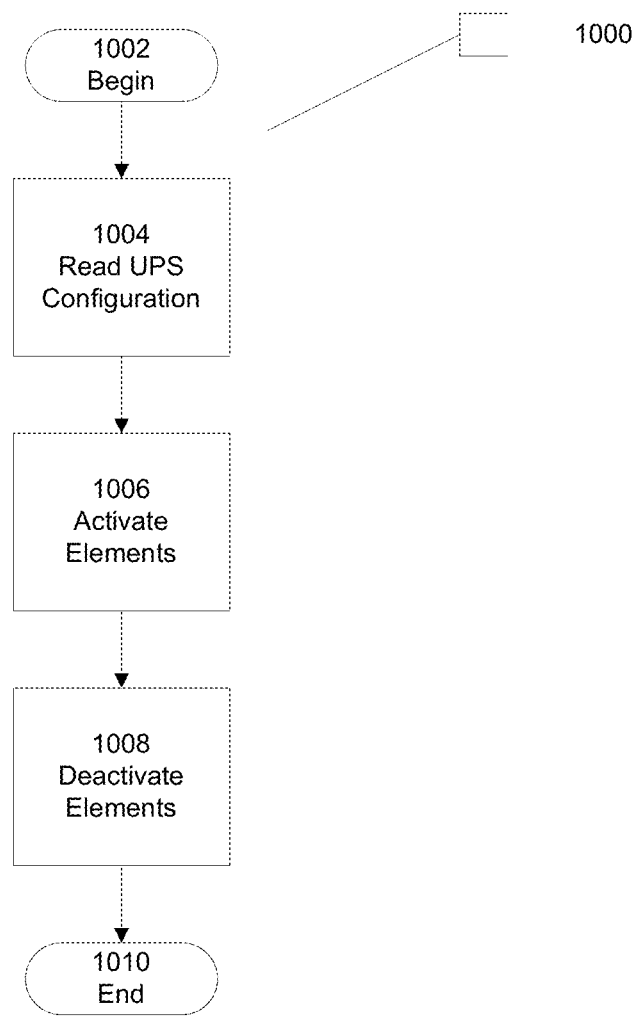
FIG. 10 is a process diagram of a process for adapting an interface structure of a UPS in accordance with the present invention.

Various examples provide processes for a UPS to adapt its interface structure. FIG. 10 illustrates one such process 1000 that includes acts of reading pertinent attributes of the configuration of the UPS, activating elements of the interface structure and deactivating elements of the interface structure. Process 1000 begins at 1002.

In act 1004, a UPS reads attributes of the UPS configuration that are pertinent to adapting the interface structure of the UPS. In one example, the UPS that reads the pertinent attributes is a UPS arranged and configured in accordance with the UPS 10, as described above. In this example, the UPS 10 reads this information from data storage associated with the controller 16 such as the memory associated with the controller 16 or the data storage 32.

In act 1006, the UPS activates elements of its interface structure based on the pertinent attributes. In one example, the UPS that activates these elements is a UPS arranged and configured in accordance with the UPS 10, as described above. In this example, the UPS 10 activates and modifies screens included in the adaptive interface structure 300, as discussed above.

In act 1008, the UPS deactivates elements of its interface structure based on the pertinent attributes. In one example, the UPS that deactivates these elements is a UPS arranged and configured in accordance with the UPS 10, as described above. In this example, the UPS 10 deactivates and modifies screens included in the adaptive interface structure 300, as discussed above.

Process 1000 ends at 1010.

Figure 11:
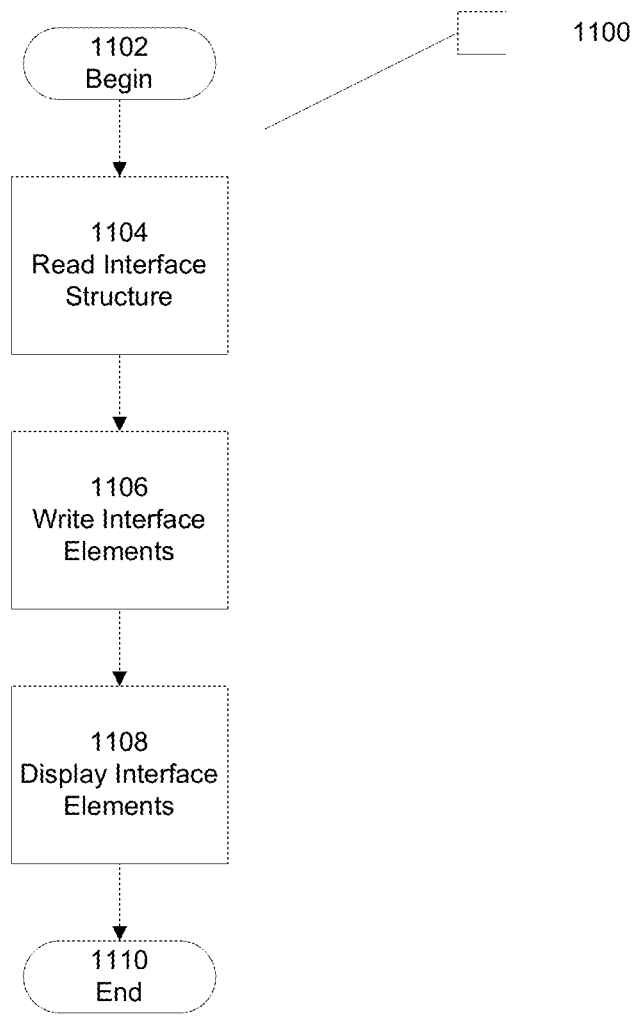
FIG. 11 is a process diagram of a process for displaying an adapted user interface of a UPS in accordance with the present invention.

Various examples provide processes for a UPS to display a user interface adapted to the operating environment of the UPS. FIG. 11 illustrates one such process 1100 that includes acts of reading the interface structure, writing elements of the interface structure and displaying the elements in the display of the UPS. Process 1100 begins at 1102.

In act 1104, a UPS reads an interface structure. In one example, the UPS that reads the interface structure is a UPS arranged and configured in accordance with the UPS 10, as described above. In this example, the UPS 10 reads the interface structure from data storage associated with the controller 16 such as the memory associated with the controller 16 or the data storage 32.

In act 1106, the UPS writes elements of the interface structure that are to be displayed into a memory associated with the user interface of the UPS. In one example, the UPS that writes these elements is a UPS arranged and configured in accordance with the UPS 10, as described above. In this example, the UPS 10 writes these elements into data storage associated with the user interface 30 such as memory associated with the user interface 30 or the data storage 32.

In act 1108, the UPS displays the interface elements in a display housed in the UPS. In one example, the UPS that displays these elements is a UPS arranged and configured in accordance with the UPS 10, as described above. In this example, the UPS 10 displays these elements in the interface display 50.

Process 1100 ends at 1110.

Each of processes 400, 500, 600, 700, 800, 900, 1000 and 1100 depicts one particular sequence of acts in a particular example. Some acts are optional and, as such, may be omitted in particular examples in accordance with the present invention. Additionally, the order of acts can be altered, or other acts can be added, without departing from the scope of the present invention. As discussed above, in at least some examples, the acts deal with data representative of tangible objects. In addition, as discussed above, in at least one example, the acts are performed on a particular, specially configured machine, namely a UPS. In other examples, the acts are performed on other particular, specially configured power devices such as, among other power devices, outlet strips, power converters, line conditioners, surge protectors, power conditioners, Power Distribution Units (PDU) and Rack PDUs.

Any reference to examples, elements or acts of the systems, machines and processes herein referred to in the singular may also embrace examples including a plurality of these elements, and any references in plural to any example, element or act herein may also embrace examples including only a single element. References in the singular or plural form are not intended to limit the presently disclosed systems, machines or processes, their components, acts, or elements.

Any example disclosed herein may be combined with any other example, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. Such terms as used herein are not necessarily all referring to the same example. Any example may be combined with any other example in any manner consistent with the aspects disclosed herein. References to "or" may be construed as inclusive so that any terms described using "or" may indicate any of a single, more than one, and all of the described terms.

Where technical features in the drawings, detailed description or any claim are followed by references signs, the reference signs have been included for the sole purpose of increasing the intelligibility of the drawings, detailed description, and claims. Accordingly, neither the reference signs nor their absence are intended to have any limiting effect on the scope of any claim elements.

Having thus described several aspects of at least one example of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A method for altering a user interface of a power device, the user interface having an interface structure, the method comprising:
   receiving, by the power device, user preference information;
   detecting, by the power device, one or more elements coupled to the power device, the one or more elements including at least one component to which the power device supplies uninterruptable power;
   storing, on the power device, information related to the one or more coupled elements including the at least one component to which the power device supplies uninterruptable power, wherein the information related to the one or more coupled elements comprises power load draw information;
   adapting, by the power device, the interface structure by modifying a hierarchy of screens included therein based at least in part on the user preference information and the detected one or more coupled elements including the at least one component to which the power device supplies uninterruptable power, wherein modifying the hierarchy of screens comprises displaying at least one of power quality information, power source information, and power load draw information; and
   providing, by the power device, at least a portion of the adapted interface structure to a user via the user interface.

2. The method according to claim 1, wherein receiving the user preference information includes receiving at least one of a display mode preference, a language preference and a menu type preference.

3. The method according to claim 1, wherein detecting one or more coupled elements includes detecting at least one peripheral.

4. The method according to claim 3, wherein detecting at least one peripheral includes detecting at least one of a network management card and an external battery.

5. The method according to claim 1, wherein detecting one or more coupled elements includes detecting a remote computer system.

6. The method according to claim 5, wherein detecting that the power device is coupled to the remote computer system includes detecting software that is installed on the remote computer system.

7. The method according to claim 1, wherein adapting the interface structure includes:
   activating elements within the interface structure; and
   deactivating elements within the interface structure.

8. The method according to claim 1, wherein providing a portion of the adapted interface structure includes displaying the portion in a display housed in the power device.

9. The method according to claim 1, further comprising prompting the user to enter at least a portion of the user preference information during the initial configuration of the power device.

10. The method according to claim 1, further comprising:
    identifying changes to at least one of the user preference information and the additional configuration information; and adapting the interface structure based at least in part on the changes.

11. A power device comprising:
a housing;
an input to receive power from a power source;
an output operatively coupled to the input and configured to provide uninterruptable power;
a user interface disposed within the housing;
a data storage disposed within the housing;
a controller coupled to the user interface and the data storage and configured to:
  receive user preference information;
  detect one or more elements coupled to the power device, the one or more elements including at least one component to which the power device supplies uninterruptable power;
  store, on the power device, information related to the one or more coupled elements including the at least one component to which the power device supplies uninterruptable power, wherein the information related to the one or more coupled elements comprises power load draw information;
  adapt the interface structure by modifying a hierarchy of screens included therein based at least in part on the user preference information and the detected one or more coupled elements including the at least one component to which the power device supplies uninterruptable power, wherein modifying the hierarchy of screens comprises displaying at least one of power quality information, power source information, and power load draw information; and
  provide at least a portion of the adapted interface structure to a user via the user interface.

12. The power device according to claim 11, wherein the controller configured to receive user preference information is further configured to receive at least one of a display mode preference, a language preference and a menu type preference.

13. The power device according to claim 11, wherein the controller configured to detect one or more coupled elements is configured to detect at least one peripheral that is coupled to the power device.

14. The power device according to claim 13, wherein the controller is configured to detect at least one of a network management card and an external battery.

15. The power device according to claim 11, wherein the controller configured to detect one or more coupled elements is configured to detect that the power device is coupled to a remote computer system.

16. The power device according to claim 15, wherein the controller is configured to detect software that is installed on the remote computer system.

17. The power device according to claim 11, wherein the controller is configured to:
  activate elements within the interface structure; and
  deactivate elements within the interface structure.

18. The power device according to claim 11, wherein the controller is configured to display the portion in a display housed in the power device.

19. The power device according to claim 11, wherein the controller is further configured to prompt the user to enter at least a portion of the user preference information during an initial power-up of the power device.

20. The power device according to claim 11, wherein the controller is further configured to:
  identify changes to at least one of the user preference information and the additional configuration information; and
  adapt the interface structure based at least in part on the changes.

21. A non-transitory computer readable medium having stored thereon sequences of instruction for altering a user interface of a power device including instructions that instruct at least one processor to:
  receive user preference information;
  detect one or more elements coupled to the power device, the one or more elements including at least one component to which the power device supplies uninterruptable power;
  store, on the power device, information related to the one or more coupled elements including the at least one component to which the power device supplies uninterruptable power, wherein the information related to the one or more coupled elements comprises power load draw information;
  adapt the interface structure by modifying a hierarchy of screens included therein based at least in part on the user preference information and the detected one or more coupled elements including the at least one component to which the power device supplies uninterruptable power, wherein modifying the hierarchy of screens comprises displaying at least one of power quality information, power source information, and power load draw information; and
  provide at least a portion of the adapted interface structure to a user via the user interface.

* * * * *